United States Patent
Caprio et al.

(10) Patent No.: US 9,869,416 B2
(45) Date of Patent: Jan. 16, 2018

(54) SWIVEL COUPLING AND HOSE ASSEMBLIES AND KITS UTILIZING THE SAME

(71) Applicant: Tectran Mfg. Inc., Cheektowaga, NY (US)

(72) Inventors: Kenneth M. Caprio, Cheektowaga, NY (US); Edward H. Badhorn, Clarence Center, NY (US); James C. Papafagos, North Java, NY (US); Bruce D. McKie, Oakville (CA)

(73) Assignee: Tectran Mfg. Inc., Cheektowaga, NY (US)

( * ) Notice: Subject to any disclaimer, the term of this patent is extended or adjusted under 35 U.S.C. 154(b) by 0 days.

(21) Appl. No.: 15/416,728

(22) Filed: Jan. 26, 2017

(65) Prior Publication Data
US 2017/0146168 A1 May 25, 2017

Related U.S. Application Data

(63) Continuation-in-part of application No. 15/233,006, filed on Aug. 10, 2016.
(Continued)

(51) Int. Cl.
*F16L 27/00* (2006.01)
*F16L 27/08* (2006.01)
*F16L 33/00* (2006.01)

(52) U.S. Cl.
CPC .............. *F16L 27/08* (2013.01); *F16L 33/00* (2013.01)

(58) Field of Classification Search
CPC .... F16L 27/08; F16L 27/0816; F16L 27/0812
(Continued)

(56) References Cited

U.S. PATENT DOCUMENTS

| 1,844,023 A | 2/1932 | Terry |
| 2,414,997 A | 1/1947 | Atkins |

(Continued)

FOREIGN PATENT DOCUMENTS

| AU | 666153 B2 | 2/1996 |
| EP | 0460791 B1 | 6/1994 |

(Continued)

OTHER PUBLICATIONS

Air Hoses. Catalog [online]. Continental Research Corporation. Retrieved from the Internet: <URL: www.crcorp.com>.
(Continued)

*Primary Examiner* — Aaron M Dunwoody
(74) *Attorney, Agent, or Firm* — Verrill Dana, LLP; John W. Powell

(57) ABSTRACT

A swivel coupling assembly includes a first annular member having at least one annular barb, a shoulder and at least one annular groove containing a seal. There is a first bearing surface and a second bearing surface either side of the annular groove. The first and second bearing surfaces have a width equal to or greater than a width of the annular groove. There is a second annular member having an inner surface defining a bore configured to receive the first annular member. When joined, the shoulder of the first annular member frictionally engages the bore of the second annular, thereby allowing rotation. The seal engages with and seals the bore at a location between the ends of the second member. and spaced by a distance of at least the width of the first and second bearing surfaces from the shoulder and the second opening, respectively.

10 Claims, 16 Drawing Sheets

Related U.S. Application Data

(60) Provisional application No. 62/287,420, filed on Jan. 26, 2016.

(58) Field of Classification Search
USPC ....... 285/276, 414, 280, 278, 321, 351, 353, 285/307
See application file for complete search history.

(56) References Cited

U.S. PATENT DOCUMENTS

| | | | |
|---|---|---|---|
| 2,433,425 A | | 12/1947 | Burckle |
| 2,475,322 A | | 7/1949 | Horton et al. |
| 2,570,406 A | | 10/1951 | Troshkin et al. |
| 2,574,625 A | | 11/1951 | Coss |
| 2,700,988 A | | 2/1955 | Smisko |
| 3,032,358 A | | 5/1962 | Rolston |
| 3,367,681 A | * | 2/1968 | Braukman .......... F16L 27/0816 285/148.13 |
| 3,600,010 A | | 8/1971 | Downs, III |
| 3,721,231 A | | 3/1973 | Hubert |
| 3,773,360 A | * | 11/1973 | Timbers ............ F16L 37/088 285/307 |
| 3,948,548 A | * | 4/1976 | Voss ............... F16L 37/088 285/148.27 |
| 4,220,359 A | | 9/1980 | Evenson et al. |
| 4,278,276 A | * | 7/1981 | Ekman .............. F16L 37/088 285/321 |
| 4,313,628 A | | 2/1982 | Duenke |
| 4,343,498 A | | 8/1982 | Campanini |
| 4,412,693 A | | 11/1983 | Campanini |
| 4,443,028 A | | 4/1984 | Hayes |
| 4,457,544 A | | 7/1984 | Snow et al. |
| 4,588,214 A | | 5/1986 | Guest |
| 4,634,151 A | | 1/1987 | Holt |
| 4,707,000 A | * | 11/1987 | Torgardh ........... F16L 37/088 285/305 |
| 4,863,202 A | * | 9/1989 | Oldford ............ F16L 19/0231 285/321 |
| 5,161,833 A | | 11/1992 | McNaughton et al. |
| 5,165,734 A | | 11/1992 | Smith |
| 5,174,611 A | | 12/1992 | Byrd et al. |
| 5,226,682 A | * | 7/1993 | Marrison ........... F16L 37/088 285/308 |
| 5,286,067 A | | 2/1994 | Choksi |
| 5,340,168 A | * | 8/1994 | Barker ............. F16L 33/223 285/147.1 |
| 5,374,084 A | | 12/1994 | Potokar |
| 5,380,301 A | | 1/1995 | Prichard et al. |
| 5,403,046 A | | 4/1995 | Kooten |
| 5,419,594 A | * | 5/1995 | Nelms ............. F16L 37/088 285/315 |
| 5,443,289 A | | 8/1995 | Guest |
| 5,468,027 A | | 11/1995 | Guest |
| 5,478,121 A | | 12/1995 | Foti |
| 5,478,122 A | | 12/1995 | Seabra |
| 5,553,893 A | | 9/1996 | Foti |
| 5,568,946 A | | 10/1996 | Jackowski |
| D384,731 S | | 10/1997 | Ramacier, Jr. et al. |
| 5,681,060 A | * | 10/1997 | Berg .............. F16L 37/088 285/305 |
| 5,857,711 A | | 1/1999 | Comin-Dumong et al. |
| 5,897,142 A | | 4/1999 | Kulevsky |
| 5,944,362 A | | 8/1999 | Harle |
| 5,944,364 A | | 8/1999 | Harle |
| 5,947,530 A | | 9/1999 | Harle |
| 6,053,537 A | * | 4/2000 | Guest ............. F16L 41/088 285/148.19 |
| 6,074,379 A | | 6/2000 | Prichard |
| 6,095,570 A | * | 8/2000 | Hagen ............. F16L 37/084 285/321 |
| 6,120,064 A | | 9/2000 | McNamara |
| 6,158,783 A | * | 12/2000 | Johnson ........... F16L 37/008 285/139.1 |
| 6,217,082 B1 | | 4/2001 | Orcutt et al. |
| 6,217,083 B1 | | 4/2001 | Bravo |
| 6,227,579 B1 | | 5/2001 | Humphreys |
| 6,254,144 B1 | | 7/2001 | Hagan |
| 6,447,017 B1 | | 9/2002 | Gilbreath et al. |
| 6,494,496 B1 | | 12/2002 | Sweeney |
| D471,262 S | | 3/2003 | Kozu |
| 6,779,269 B2 | | 8/2004 | Green |
| 6,817,391 B2 | * | 11/2004 | Riviezzo ............ F16L 27/093 141/368 |
| D501,539 S | | 2/2005 | Dyer, III |
| D508,980 S | | 8/2005 | Bigelow |
| 7,011,342 B2 | | 3/2006 | Guivarc'h et al. |
| 7,267,374 B2 | * | 9/2007 | Nielson ............ F16L 27/0808 285/353 |
| D570,457 S | | 6/2008 | Brown |
| D616,969 S | | 6/2010 | Zore |
| 7,963,570 B2 | * | 6/2011 | Swift .............. F16L 37/088 285/277 |
| 8,056,937 B2 | | 11/2011 | Guest |
| 8,083,266 B2 | | 12/2011 | Tarquini et al. |
| 8,162,354 B2 | | 4/2012 | Takizawa |
| 8,257,286 B2 | | 9/2012 | Meyer et al. |
| 8,474,879 B2 | * | 7/2013 | Herrera ........... F16L 37/088 285/321 |
| D698,440 S | | 1/2014 | Lombardi, III et al. |
| 2003/0025096 A1 | * | 2/2003 | Jeory .............. F16L 29/02 251/149 |
| 2003/0057699 A1 | | 3/2003 | Persohn et al. |
| 2003/0067161 A1 | | 4/2003 | Smith et al. |
| 2004/0130150 A1 | | 7/2004 | Stark |
| 2006/0108790 A1 | | 5/2006 | Powell et al. |
| 2006/0186661 A1 | | 8/2006 | Levan |
| 2006/0226651 A1 | | 10/2006 | Griswold et al. |
| 2008/0185842 A1 | | 8/2008 | Blackman |
| 2013/0150807 A1 | | 6/2013 | Hamuro et al. |
| 2014/0318664 A1 | * | 10/2014 | Mayher ............ F16L 27/0861 138/155 |
| 2015/0115597 A1 | | 4/2015 | Lorraine |
| 2015/0219259 A1 | | 8/2015 | Weems et al. |

FOREIGN PATENT DOCUMENTS

| | | |
|---|---|---|
| EP | 2584239 A1 | 4/2013 |
| EP | 2584239 B1 | 3/2014 |
| GB | 761420 A | 11/1956 |
| GB | 811301 A | 4/1959 |
| JP | 2011089598 A | 5/2011 |
| WO | 9627097 A1 | 9/1996 |
| WO | 2005081901 A2 | 9/2005 |
| WO | 2006112726 A1 | 10/2006 |
| WO | 2007049053 A1 | 5/2007 |
| WO | 2015020901 A1 | 2/2015 |

OTHER PUBLICATIONS

Live Hydraulic Swivels. Catalog [online]. Pressure Connections Corp. [retrieved on May 9, 2013]. Retrieved from the Internet: <URL:www.pressureconnections.com>.

Live Swivels Product Details. Catalog [online]. My Fittings Unlimited, Inc. [retrieved on Mar. 13, 2016] Retrieved from the Internet: <URL: www.myfui.com/ProductDetail.aspx?CID=71&SCID=68 &PID=6320&pimage=SLS-2406.jpg&mid=11>.

Push > Connect Brass Fittings. Catalog [online], pp. 65-74. Weatherhead [retrieved on Mar. 13, 2016]. Retrieved from the Internet: <URL: www.kentrubber.com>.

Tectran Dual LIFESwivel™ Live Swivel Hose Assemblies. Product details [online]. Tectran Manufacturing, Inc. [retrieved on Mar. 13, 2016]. Retrieved from the Internet: <URL: www.tectran.com/catalog.asp?main=air&sub1=hose_assemblies&sub2= &product=dual_live_swvl_hose_assy>.

Live Swivel Hose Presentation. Product details [online]. Tramec

(56) References Cited

OTHER PUBLICATIONS

Sloan. [Retrieved on Mar. 13, 2016]. Retrieved from the Internet: <URL: www.tramec.com/news/restricted/hoses/frames.htm>.

* cited by examiner

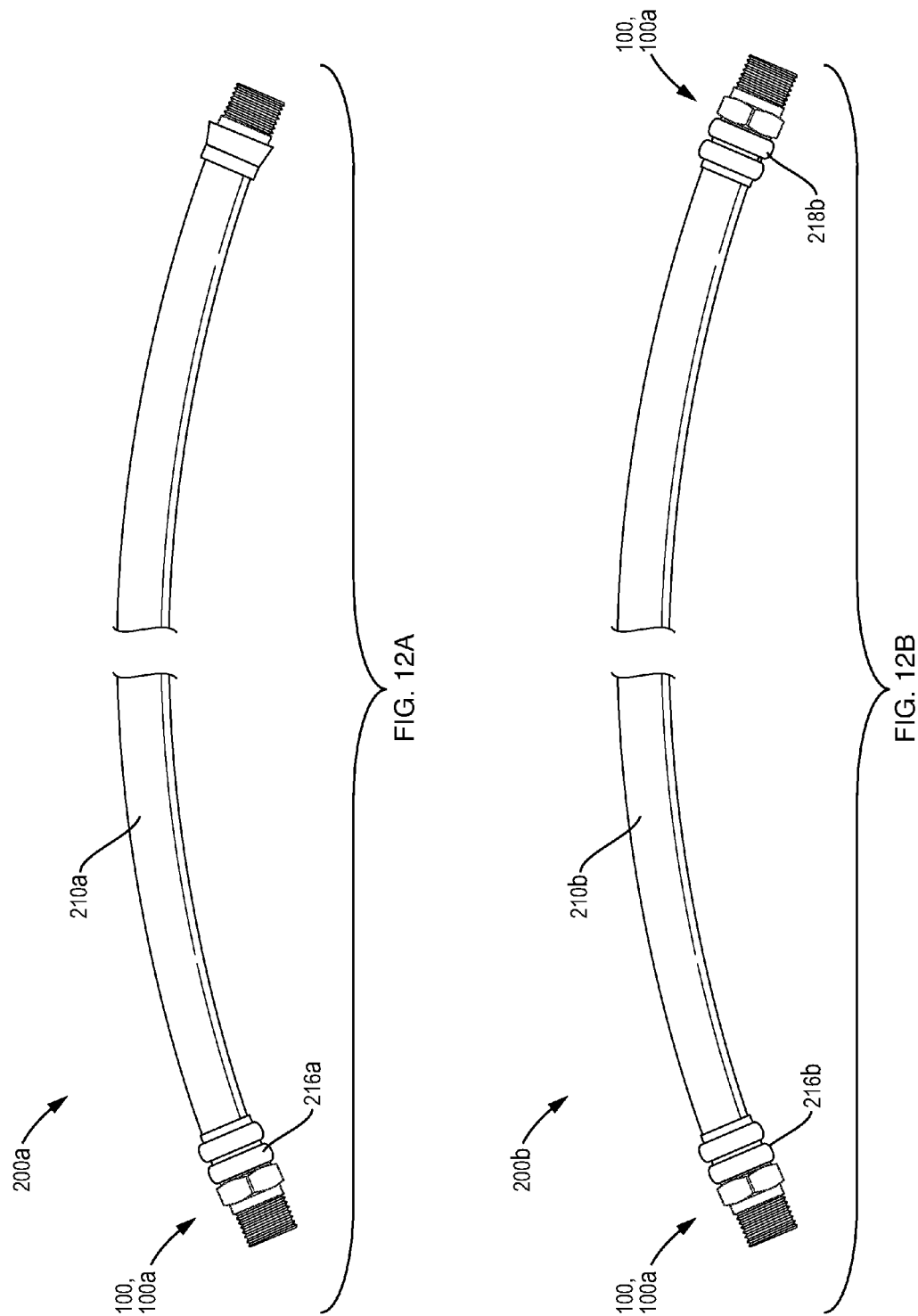

SWIVEL COUPLING AND HOSE ASSEMBLIES AND KITS UTILIZING THE SAME

CROSS REFERENCE TO RELATED APPLICATIONS

This application is a continuation-in-part of U.S. patent application Ser. No. 15/233,006 filed Aug. 10, 2016, which claims benefit of priority of U.S. Provisional Patent Application Ser. No. 62/287,420 filed Jan. 26, 2016, both of which are incorporated herein by reference.

FIELD OF THE INVENTION

The invention described herein relates generally to the field of swivel coupling assemblies and to swivel coupling assemblies which are easy to install and highly reliable even when used with tube and hose lines operating in harsh industrial and commercial environments. More specifically, the present invention provides improved operation, durability, dependability, weather-resistance, usability, and reliability of swivel couplings, assemblies, and kits for air and hydraulic connections in tractor-trailer and other industrial and commercial applications and environments.

BACKGROUND OF THE INVENTION

Applications of fittings and fitting assemblies for air tube and hose line connections in industrial and commercial environments require resistance to harsh environmental conditions and reliability under stress during installation and operation. For example, in applications in the freight hauling trucking and transportation industry, tractor-trailer air brake fittings and hose and tube assemblies undergo continuous exposure to the elements, often in frigid conditions. Winter road salts and brine, dirt, grease, and other solvents erode fittings and assemblies of critical air brake tube and hose connections, putting the safety of the driver and highway motorists at risk.

Tube and hose lines, as well as grips, fittings and connectors/couplings for such tube and hose lines used within harsh industrial and commercial environments generally must withstand such harsh environments as well as perform reliably under the stress and strain forces encountered during installation and operation. Such tube and hose lines may involve high pressure hydraulics or air and often require some flexibility of the tube or hose. It should be understood that the terms "hose" and "tube", while often used interchangeably, are technically different components. Hoses are generally reinforced in some way, normally with imbedded braid reinforcement, wire reinforcement, reinforcement with a stiff plastic, dual walls, or a single heavy wall. Hoses are often used and rated for applications that involve high pressure. Tubing, on the other hand, is not reinforced, or is sparsely reinforced, and is often used for gravity flow or lower pressure applications.

Hoses and tubes are commonly used in applications within the freight hauling industry, for example, to supply pressurized air for air brake operation between a tractor cab unit and a freight trailer, or from a locomotive to railway air brakes on railroad cars. Inherent to the freight industry is the constant coupling and decoupling of hoses/tubes as trailers are left for loading or unloading and other trailers are picked up for delivery. Various types of components such as gladhand connectors (couplers resembling a pair of "hands shaking"), grips and couplers/connectors, including swivel couplings, are used to interconnect hose/tube sections to other hoses/tubes sections and to terminals.

During installation and operation of such hoses and components in the freight hauling context, stresses from bending, twisting, and kinking are experienced. For instance, tractor-trailer operators subject air brake lines to twisting while bending them into position in tight quarters between the tractor and trailer. Drivers and fleet maintenance personnel repetitively connect and disconnect air brake lines between the tractor and trailer using hand holds on the hose at the fittings to achieve the needed leverage to secure and release gladhand connections. Connection of tractor to trailer using integrated, multiple hose and tube assemblies, or "kits", often wrapped or covered with abrasion resistant materials, requires flexibility in the manner of coupling the multiple fittings to their respective fixed air and hydraulic connections.

Conventional grips and couplers/connectors including swivel couplings, however, do not offer sufficient protection against kinking of the hose and tube, particularly at the gladhand connections and occasionally in tractor connections where the ports are mounted higher and their output is pointed vertically requiring the hose to bend toward the trailer, and are difficult to install and not sufficiently reliable during operation. Conventional hose and tube assemblies using only coiled springs or bend restrictors of a thin, flimsy or too-rigid materials and sometimes of a not-firmly attached nature at the fittings provide inadequate protection from the shearing action that takes place during gladhand connection. In the case of the common spring guard, the spring coils shift and do not prevent kinking and bending during installation and operation.

In particular, in the freight hauling industry, conventional air brake tube or hose fittings and tube or hose assemblies undergo stress during tractor-trailer connections and operation. The conventional non-swivel hose and tube fittings and assemblies prevent ease of connecting hose and tube assemblies to the tractor braking air supply lines and typically require the "cork-screwing" of fixed male fittings into fixed swivel fittings, or the disassembly and reassembly of the fittings during installation. During operation, fixed end fittings prevent rotation of hoses where some movement is desirable, such as during lift axle operation, putting further stress on the air brake hose and tube fittings and assemblies and leading to premature failure of the tractor-trailer air brake system. Prior art live swivel fittings do not provide sufficient support, free, (live) rotation and assembly integrity under stress or the long-term sealing qualities necessary in harsh environmental and operational conditions. Connection of conventional hose assemblies typically requires multiple wrenches to couple hose assemblies to fixed fittings or to join multiple hose assemblies. The use of crimped nuts in prior art live swivel fittings requires the use of materials such as steel rather than the more malleable brass to prevent over-torquing and leakage. This leads to corrosion issues and fitting seize-up.

SUMMARY OF INVENTION

It is therefore an object of the invention to provide grips, swivel couplings, hose assemblies and kits which protect against stresses caused by kinking, twisting, bending, snagging, tangling and abrading.

It is another object of the invention to provide swivel couplings and swivel coupling assemblies with improved rotation during installation and operation, protecting the system's integrity and ease of connecting and disconnecting of connections at the mating couplings such as tractor and trailer gladhands.

It is yet a further object of the invention to provide swivel couplings and swivel coupling assemblies with longer-life, redundant air seals, and a stronger friction hold at the barrel end of the fitting.

In a first aspect of this invention there is included a swivel coupling assembly, comprising a first annular member having an outer surface and an inner surface. The first annular member includes a first end portion having at least one annular barb, a second end portion spaced from the first end portion and an insert member. There is a shoulder positioned between the at least one annular barb and the insert member and at least one annular groove disposed in the outer surface of the first annular member positioned between the shoulder and the insert member and the at least one annular groove containing a seal. There is a first bearing surface on a first side of the at least one annular groove in the direction of the shoulder and a second bearing surface on a second side of the at least one annular groove in the direction of the insert member. The first bearing surface and the second bearing surface have a width equal to or greater than a width of the at least one annular groove. There is a second annular member having an outer surface and an inner surface, the inner surface defining a bore configured to receive the first annular member. The second annular member includes a first end portion having a first opening in communication with the bore and a second end portion spaced from the first end portion and having a second opening in communication with the bore. When the first annular member is inserted into the bore of the second annular member, the shoulder of the first annular member frictionally engages the bore of the second annular member proximate the first opening. This allows the first annular member to rotate relative to the second annular member. The insert member of the first annular member terminates in the bore proximate the second opening and the seal engages with and seals the bore at a location between the first and second openings of second annular member. The at least one annular groove is spaced by a distance of at least the width of the first and second bearing surfaces from the shoulder and the second opening, respectively.

In one or more embodiments the following features may be included. The at least one annular groove may include a plurality of annular grooves and a like plurality of seals, one disposed in each of the plurality of annular grooves. The first bearing surface and the second bearing surface may have widths between one (1) and three and one half (3.5) times the width of the at least one annular groove. There may be included an annular retaining ring groove disposed in the surface of the first annular member and positioned between the at least one annular groove and the shoulder, the annular retaining ring groove containing a retaining ring which protrudes above the surface of the first annular member. There may also be included an annular recess in the inner surface of the bore, wherein the annular recess is configured to receive the retaining ring when the first annular member is inserted into the second annular member, and wherein the annular recess is located at a position between the shoulder and the at least one annular groove containing the seal. The inner surface of the bore from the first opening in the first end portion of the second annular member to the annular recess may be frusto-conically shaped and wherein the frusto-conically shaped inner surface is angled at least five degrees with respect to a longitudinal axis of the second annular member, thereby allowing the retaining ring to be gradually compressed when the first annular member is inserted into the bore of the second annular member as the retaining ring travels along the inner surface until it reaches the annular recess and expands into and is seated in the annular recess. The first opening in the first end portion may have a chamfered edge. The first annular member may further include a flange located between the shoulder and the plurality of grooves which engages with a stop on the inner surface of the bore when the first annular member is inserted into the second annular member to position the first annular member within the bore such that the shoulder of the first annular member frictionally engages the bore of the second annular member proximate the first opening and the insert member of the second end portion of the first annular member terminates in the bore proximate the second opening. The first end portion of the first annular member may include a plurality of annular barbs which are configured to engage and retain a hose. The inner surface of the first annular member may define a bore configured to carry a fluid there-through. The outer surface of the second annular member may include a threaded portion for being inserted into and engaged with a hose or a complimentarily threaded fixture. The outer surface of the second annular member may further includes a head having a plurality of flat surfaces configured to be engaged by a tool to impart torque to rotate the second annular member to engage the hose or a complimentarily threaded fixture.

In another aspect of this invention there is a hose assembly, comprising a hose having a first end and a second end, a first swivel coupling affixed to the first end of the hose, a second swivel coupling affixed to the second end of the hose. Each of the first and second swivel couplings include a first annular member having an outer surface and an inner surface. The first annular member including a first end portion having at least one annular barb, a second end portion spaced from the first end portion and an insert member. There is a shoulder positioned between the at least one annular barb and the insert member and at least one annular groove disposed in the outer surface of the first annular member positioned between the shoulder and the insert member and the at least one annular groove containing a seal. There is a first bearing surface on a first side of the at least one annular groove in the direction of the shoulder and a second bearing surface on a second side of the at least one annular groove in the direction of the insert member. The first bearing surface and the second bearing surface have a width equal to or greater than a width of the at least one annular groove. There is a second annular member having an outer surface and an inner surface, the inner surface defining a bore configured to receive the first annular member. The second annular member includes a first end portion having a first opening in communication with the bore and a second end portion spaced from the first end portion and having a second opening in communication with the bore. When the first annular member is inserted into the bore of the second annular member, the shoulder of the first annular member frictionally engages the bore of the second annular member proximate the first opening. This allows the first annular member to rotate relative to the second annular member. The insert member of the first annular member terminates in the bore proximate the second opening and the seal engages with and seals the bore at a location between the first and second openings of second annular member. The at least one annular groove is spaced by a distance of at least the width of the first and second bearing surfaces from the shoulder and the second opening, respectively.

In one or more embodiments the following features may be included. The at least one annular groove of the first and second swivel couplings may include a plurality of annular grooves and may further include a like plurality of seals, one disposed in each of the plurality of annular grooves. The first bearing surface and the second bearing surface may have widths between one (1) and three and one half (3.5) times the width of the at least one annular groove. The first and second swivel couplings may further include an annular retaining ring groove disposed in the surface of the first annular member and positioned between the at least one annular groove and the shoulder, the annular retaining ring groove containing a retaining ring which protrudes above the surface of the first annular member. The first and second swivel couplings may further include an annular recess in the inner surface of the bore, wherein the annular recess is configured to receive the retaining ring when the first annular member is inserted into the second annular member, and wherein the annular recess is located at a position between the shoulder and the at least one annular groove containing the seal. For the first and second swivel couplings the inner surface of the bore from the first opening in the first end portion of the second annular member to the annular recess may be frusto-conically shaped and wherein the frusto-conically shaped inner surface is angled at least five degrees with respect to a longitudinal axis of the second annular member, thereby allowing the retaining ring to be gradually compressed when the first annular member is inserted into the bore of the second annular member as the retaining ring travels along the inner surface until it reaches the annular recess and expands into and is seated in the annular recess. For the first and second swivel couplings the first opening in the first end portion may have a chamfered edge. Proximate each of the first end and the second end of the hose may be included a collar disposed about the hose, the collar including an identification marking.

In yet another aspect of this invention there is a hose assembly, comprising a hose having a first end and a second end, a grip and fitting assembly affixed to the first end of the hose and a swivel coupling affixed to the second end of the hose. The swivel coupling includes a first annular member having an outer surface and an inner surface. The first annular member including a first end portion having at least one annular barb, a second end portion spaced from the first end portion and an insert member. There is a shoulder positioned between the at least one annular barb and the insert member and at least one annular groove disposed in the outer surface of the first annular member positioned between the shoulder and the insert member and the at least one annular groove containing a seal. There is a first bearing surface on a first side of the at least one annular groove in the direction of the shoulder and a second bearing surface on a second side of the at least one annular groove in the direction of the insert member. The first bearing surface and the second bearing surface have a width equal to or greater than a width of the at least one annular groove. There is a second annular member having an outer surface and an inner surface, the inner surface defining a bore configured to receive the first annular member. The second annular member includes a first end portion having a first opening in communication with the bore and a second end portion spaced from the first end portion and having a second opening in communication with the bore. When the first annular member is inserted into the bore of the second annular member, the shoulder of the first annular member frictionally engages the bore of the second annular member proximate the first opening. This allows the first annular member to rotate relative to the second annular member. The insert member of the first annular member terminates in the bore proximate the second opening and the seal engages with and seals the bore at a location between the first and second openings of second annular member. The at least one annular groove is spaced by a distance of at least the width of the first and second bearing surfaces from the shoulder and the second opening, respectively.

In yet one or more other embodiments the following features may be included. The at least one annular groove of the swivel coupling may include a plurality of annular grooves and further included are a like plurality of seals, one disposed in each of the plurality of annular grooves. The first bearing surface and the second bearing surface may have widths between one (1) and three and one half (3.5) times the width of the at least one annular groove. The swivel coupling may further include an annular retaining ring groove disposed in the surface of the first annular member and positioned between the at least one annular groove and the shoulder, the annular retaining ring groove containing a retaining ring which protrudes above the surface of the first annular member. The swivel coupling may further include an annular recess in the inner surface of the bore, wherein the annular recess is configured to receive the retaining ring when the first annular member is inserted into the second annular member, and wherein the annular recess is located at a position between the shoulder and the at least one annular groove containing the seal. For the swivel coupling the inner surface of the bore from the first opening in the first end portion of the second annular member to the annular recess may be frusto-conically shaped and wherein the frusto-conically shaped inner surface is angled at least five degrees with respect to a longitudinal axis of the second annular member, thereby allowing the retaining ring to be gradually compressed when the first annular member is inserted into the bore of the second annular member as the retaining ring travels along the inner surface until it reaches the annular recess and expands into and is seated in the annular recess. The first opening in the first end portion may have a chamfered edge.

In an additional aspect of this invention there is a kit having a plurality of hose assemblies bundled together with a wrap. At least one of the hose assemblies includes a hose having a first end and a second end, a grip and fitting assembly affixed to the first end of the hose, a swivel coupling affixed to the second end of the hose. The swivel coupling includes a first annular member having an outer surface and an inner surface. The first annular member including a first end portion having at least one annular barb, a second end portion spaced from the first end portion and an insert member. There is a shoulder positioned between the at least one annular barb and the insert member and at least one annular groove disposed in the outer surface of the first annular member positioned between the shoulder and the insert member and the at least one annular groove containing a seal. There is a first bearing surface on a first side of the at least one annular groove in the direction of the shoulder and a second bearing surface on a second side of the at least one annular groove in the direction of the insert member. The first bearing surface and the second bearing surface have a width equal to or greater than a width of the at least one annular groove. There is a second annular member having an outer surface and an inner surface, the inner surface defining a bore configured to receive the first annular member. The second annular member includes a first end portion having a first opening in communication with the bore and a second end portion spaced from the first end portion and having a second opening in communication with the bore. When the first annular member is inserted into the bore of the second annular member, the shoulder of the first annular member frictionally engages the bore of the second annular member proximate the first opening. This allows the first annular member to rotate relative to the second annular member. The insert member of the first annular member terminates in the bore proximate the second opening and the seal engages with and seals the bore at a location between the first and second openings of second annular member. The at least one annular groove is spaced by a distance of at least the width of the first and second bearing surfaces from the shoulder and the second opening, respectively.

In one or more embodiments the following features may be included. The at least one annular groove of the swivel coupling may include a plurality of annular grooves and further included are a like plurality of seals, one disposed in each of the plurality of annular grooves. The first bearing surface and the second bearing surface may have widths between one (1) and three and one half (3.5) times the width of the at least one annular groove. The swivel coupling may further include an annular retaining ring groove disposed in the surface of the first annular member and positioned between the at least one annular groove and the shoulder, the annular retaining ring groove containing a retaining ring which protrudes above the surface of the first annular member. There may further be included an annular recess in the inner surface of the bore, wherein the annular recess is configured to receive the retaining ring when the first annular member is inserted into the second annular member, and wherein the annular recess is located at a position between the shoulder and the at least one annular groove containing the seal. The inner surface of the bore from the first opening in the first end portion of the second annular member to the annular recess may be frusto-conically shaped and wherein the frusto-conically shaped inner surface is angled at least five degrees with respect to a longitudinal axis of the second annular member, thereby allowing the retaining ring to be gradually compressed when the first annular member is inserted into the bore of the second annular member as the retaining ring travels along the inner surface until it reaches the annular recess and expands into and is seated in the annular recess. The first opening in the first end portion may have a chamfered edge.

The above and other benefits and advantages of the present invention will be readily apparent from the Detailed Description to follow.

BRIEF DESCRIPTION OF THE DRAWINGS

Embodiments of the present invention will now be described, by way of example only, with reference to the attached Figures, wherein:

FIGS. 12A and 12B are a perspective views of hose assemblies with single and dual swivel couplings, respectively, according to an aspect of this invention;

DETAILED DESCRIPTION

The present invention will now be described more fully herein with reference to exemplary embodiments, examples of which are illustrated in the accompanying drawings. Embodiments and implementations set forth in the following detailed description do not represent all embodiments and implementations of the claimed invention. One skilled in the art will appreciate that the present teachings can be practiced with embodiments other than those summarized or disclosed below by the Figures and Detailed Description of the Invention to follow.

For purposes of the following discussion, the terms "hose" and "tube" may be used throughout interchangeably and should not be considered as limiting the invention. Use of either term is meant to encompass both hoses and tubes and all applicable types of such hoses and tubes. Likewise, the exemplary embodiments may describe particular connectors, flexible tapered grips and couplers/connectors, including swivel couplings, however, it should be understood that these are examples of implementations of the present invention. Indeed, the present invention may be implemented within a variety of connectors, flexible tapered grips and couplers/connectors including swivel couplings.

Further, the invention is described herein with regard to transportation applications, in particular trucking; however, there may be other equally suitable applications of the present invention outside of the context of trucking and such applications are well within the intended scope of the present disclosure. In particular, the present invention may be applicable to any suitable mobile or fixed implementations including, but not limited to, air or gas, hydraulic connections, fuel or other fluid transfer, land or marine connections, airplane terminal vestibules, and/or ship-to-shore connections.

A flexible tapered grip assembly for installation in accordance with an aspect of the invention will first be described. Following the description of the flexible tapered grip assembly will be a description of the improved swivel coupling according to another aspect of the invention and then certain hose assemblies/kits using the flexible tapered grip assembly and/or the swivel coupling will be described.

Flexible Tapered Grip

Figure 1:
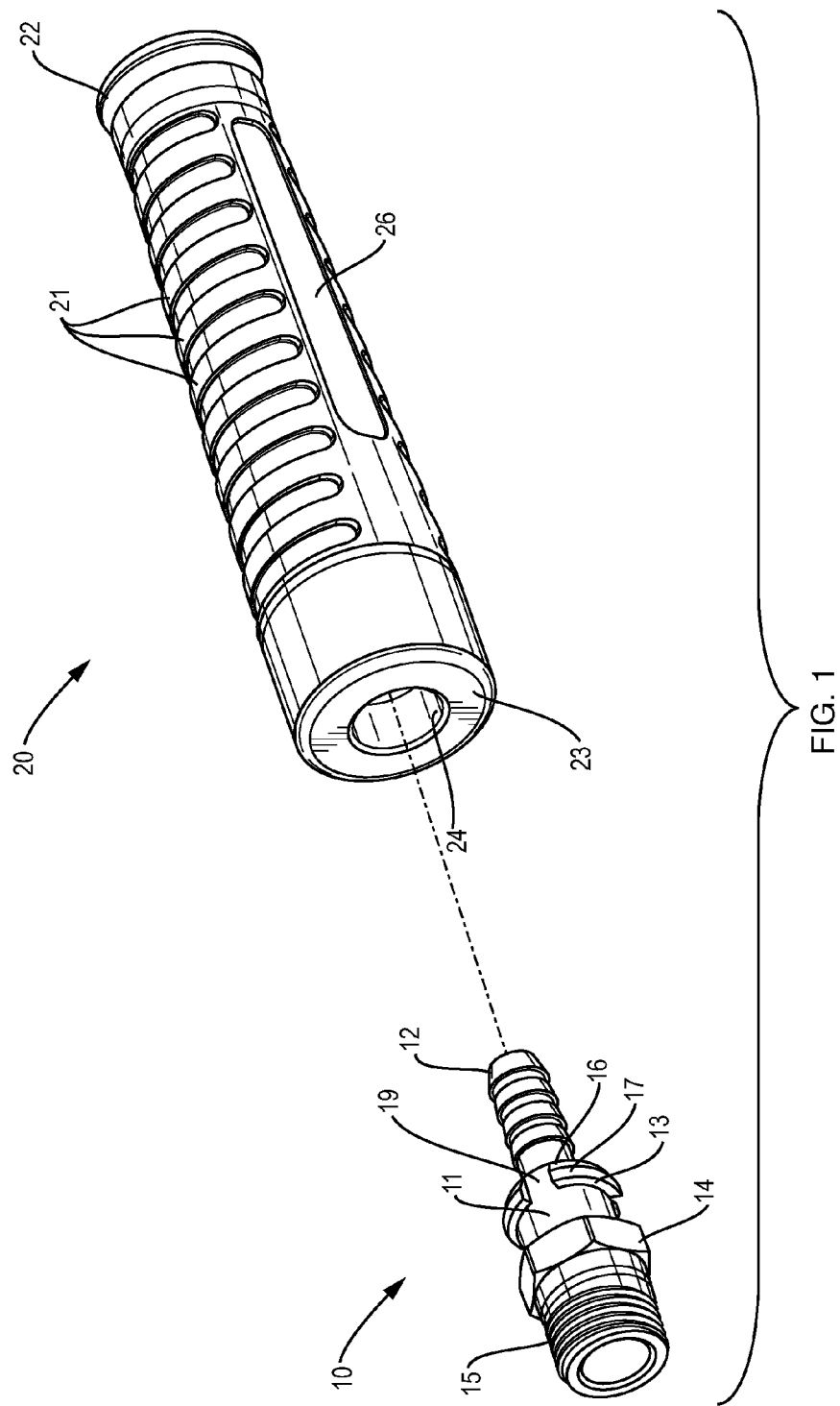
FIG. 1 shows a perspective view of flexible tapered grip assembly according to the present invention shown with grip and fitting sections disconnected.

With regard to FIG. 1, there is seen a three-dimensional illustration showing a flexible tapered grip assembly in accordance with the present invention shown with two sections, one being a fitting 10 and the other being a grip 20. For purposes of illustration, the assembly is shown where the fitting 10 and grip 20 are in a disconnected position relative to one another.

The grip 20 is a both flexible and tapered. Flexibility of the grip provides the ability of the grip to bend and yet return to its original shape. The grip 20 itself is a unitary structure fabricated from material suitable for the intended trucking environment which may be hostile to materials—i.e., where wide temperature variations occur and exposure to road salt and a variety of chemicals may occur. One suitable material includes thermoplastic vulcanizates (TPV) which are part of the thermoplastic elastomer (TPE) family of polymers. TPVs offer a combination of elastomeric properties, like compression and tension set, coupled with aging performance and chemical resistance. Other materials such as, but not limited to, ethylene propylene diene monomer (EPDM) thermoset rubber, nylon, or polyvinyl chloride (PVC) may be possible depending upon the intended environment. For example, PVC may not be suitably used for an intended cold weather implementation where flexibility is severely limited at reduced environmental temperatures. The grip 20 may be formed in any suitable manner including, but not limited to, injection molding. It should also be understood that the grip may be colored during molding and provided in a variety of color schemes (i.e., color coded) in accordance with any desired implementation (e.g. red for emergency brake lines, blue for service lines) and which assists to minimize incorrect tractor/trailer connections With continued reference to FIG. 1 and additional reference to FIG. 2, the grip 20 is seen as tapered from end to end. In particular, the grip 20 has an increased thickness at a first end 23 tapering to an opposite, second end that includes a tear-resistant rail 22. The rail 22 is thickened so as to form a suitably reinforced ring around a length of air hose (shown by dotted line 30). Oftentimes, such portion of air hose also includes a spring guard (not shown) to assist and support the flexing of the hose. Providing the thickened rail 22 at the spring guard end of the grip 20 prevents tearing of the grip 20 and improves kink resistance of hose and tube made of weather resistant, low-temperature materials and coatings.

The grip 20 includes traction ridges 21 for an additional non-slip feature when the grip 20 is handled by a user. Recessed areas 26 (and 27 visible in FIGS. 3 and 4) may be provided for corporate labeling or cosmetic logos.

A fitting 10 is also shown in accordance with the inventive assembly. The fitting 10 includes a first coupling end 15 and a second coupling end 12 between which is located an exterior seating surface 11. It is the exterior seating surface 11 of the fitting 10 and the interior seating surface 24 of the grip 20 which are intended to abut upon insertion of the fitting 10 into the first end 23 of the grip 20. Such insertion is shown and described further below with regard to FIGS. 5A through 5C.

Figure 2:
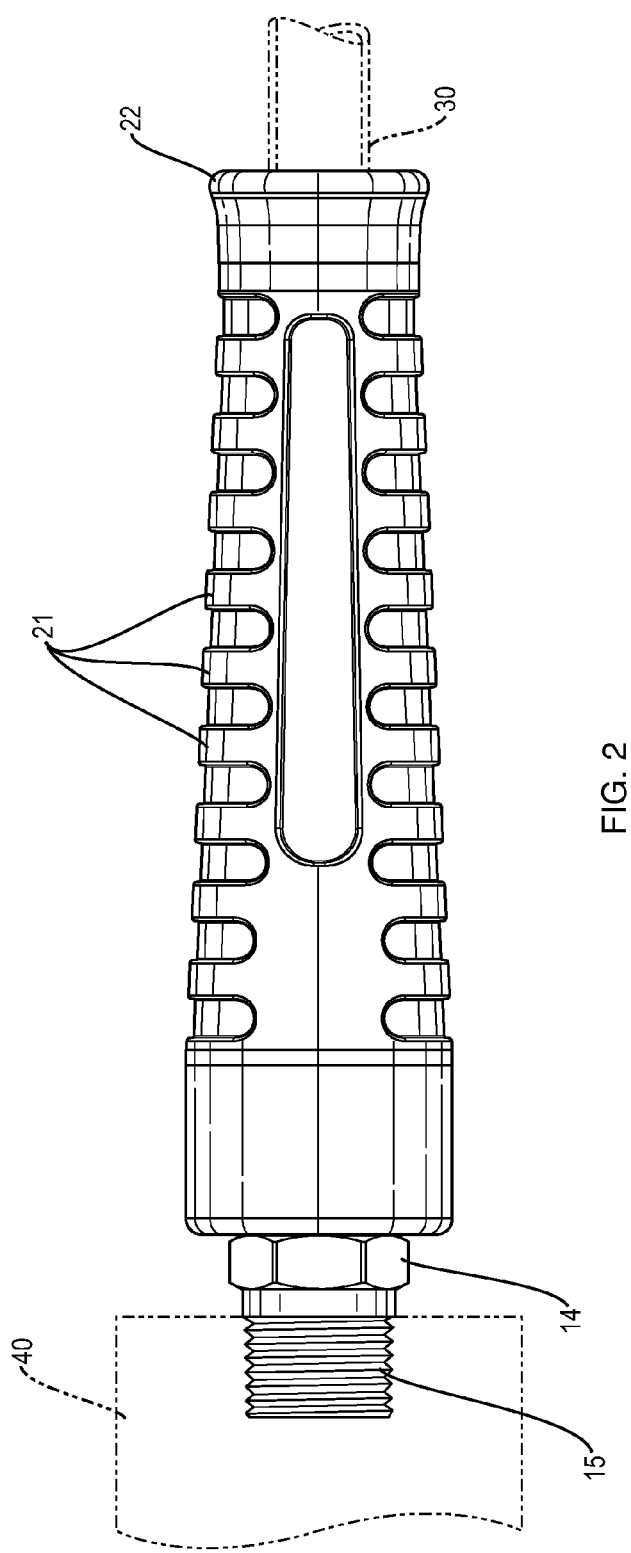
FIG. 2 shows a side view of a complete flexible tapered grip assembly of the invention connected with related elements shown in silhouette.

With continued reference to FIGS. 1 and 2, the fitting 10 is seen to include a retaining shoulder 17 located between the first coupling end 12 and the second coupling end 15. The retaining shoulder 17 has two sides with two very distinct purposes. One side of the retaining shoulder 17 includes a ramped surface 16. The ramped surface 16 is intended as the part of the fitting 10 which first contacts the first end 23 of the grip 20 upon insertion of the fitting 10 into the grip 20. The interior seating surface 11 may also include a beveled edge which facilitates the ramped surface 16 to at least initially contact the interior seating surface 11. The other side of the retaining shoulder 17 includes a shoulder surface 13. The shoulder surface 13 is opposite the ramped surface 16 and is oriented perpendicular to the exterior seating surface 11.

The fitting 10 itself is formed from a corrosion-resistant material such as, but not limited to brass. The first end 15 of the fitting is provided with threading and a hex-nut section 14 of the fitting 10 is provided to enable a user to utilize a wrench to connect the fitting 10 to a coupling mechanism (shown in dotted line as 40). The coupling mechanism 40 may be any suitable universal coupling mechanism such as, but not limited to, the aforementioned gladhand or similar coupler. As should be readily apparent from the description thus far and the accompanying FIG. 2, the inventive grip and fitting assembly provides a new and useful means of connecting a universal coupling 40 to a length of hose 30.

Figure 3:
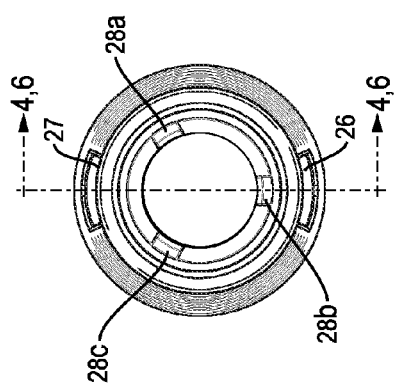
FIG. 3 shows an end view of the grip section of the invention, the end view being from the right end of FIG. 4.
Figure 4:
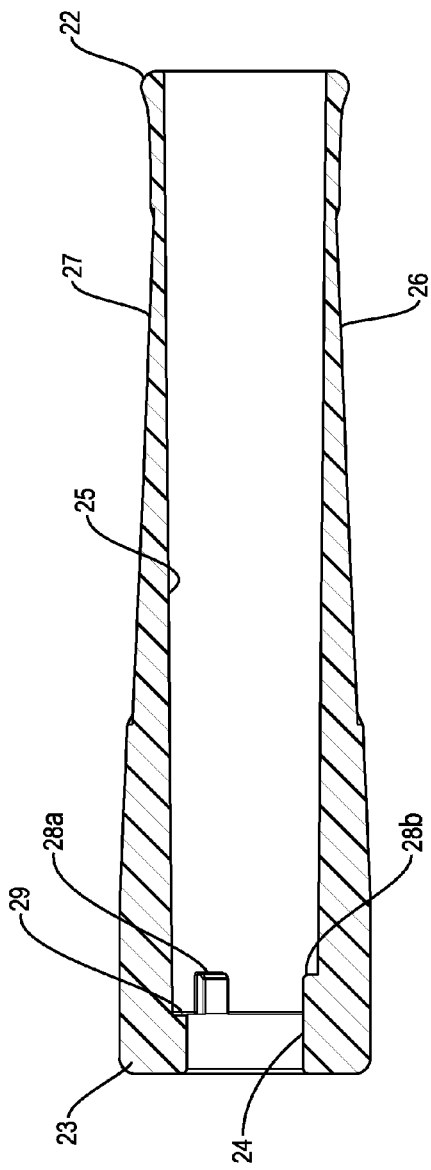
FIG. 4 shows a side section view of the grip section of the invention taken along line 4-4 of FIG. 3.

With reference to FIGS. 3 and 4, there are respectively shown an end view and a side cross section view of the grip 20. In particular, FIG. 3 shows an end view of the grip section of the invention, the end view being from the right end of FIG. 4 while FIG. 4 shows a side section view of the grip section of the invention taken along line 4-4 of FIG. 3. Here, the grip 20 is seen to include three keyway bosses 28*a*, 28*b*, 28*c* with only two 28*a*, 28*b* visible in cross section FIG. 4.

It should be understood that each keyway boss 28*a*, 28*b*, 28*c* corresponds to a keyway recess 19 located on the fitting 10. As seen in FIG. 1, the retaining shoulder 17 includes such keyway recesses and which are suitably dimensioned to matingly correspond a related keyway boss though only one of three such keyway recesses are visible. From FIG. 4, it can be seen that each keyway boss (28*a* and 28*b* visible) are located within a sidewall 25 of the substantially tubular interior 25 of the grip 20. More specifically, each keyway boss is arranged along an annular lip 29 and adjacent to the interior seating surface 24. It should be noted that while three keyway bosses and three corresponding keyway recesses are discussed, there may be any number of suitable pairs of keyway bosses and recesses such as, but not limited to, one, two, or four.

The annular lip 29 is configured perpendicular to the interior seating surface 24 and provides a surface against which the shoulder surface 13 of the fitting's shoulder 17 firmly abuts once the fitting 10 is completely inserted within the first end 23 of the grip 20.

Figure 5A:
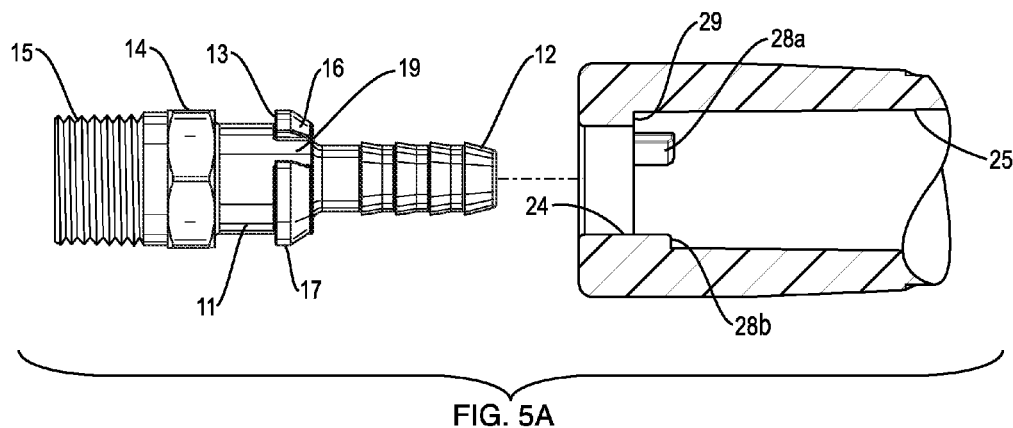
FIGS. 5A through 5C show a series of close-up side views with the fitting section shown intact and a partial length of the grip section shown in a cutaway lengthwise cross section so as to illustrate the before, during, and after stages of fitting insertion into the grip.
Figure 5B:
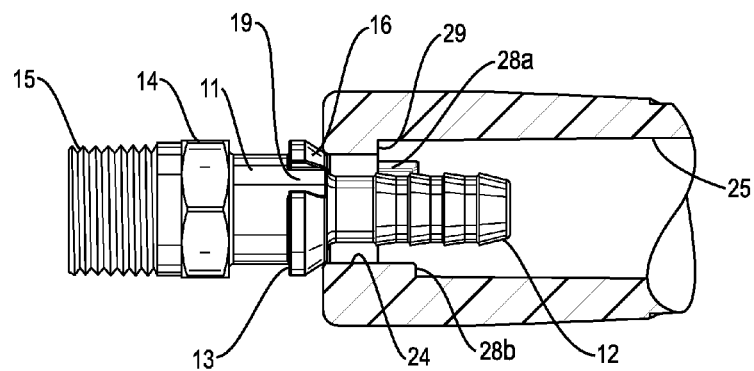
Figure 5C:
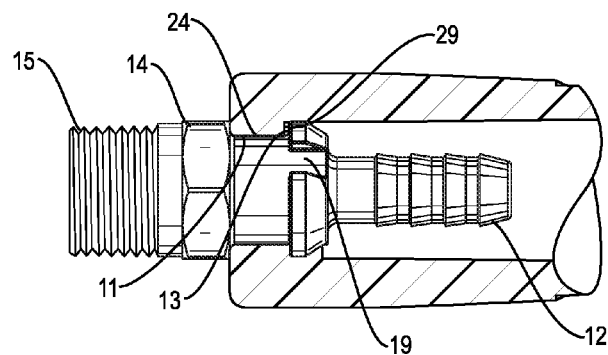

With regard to FIGS. 5A through 5C, there are illustrated a series of close-up side views showing the fitting along with a partial length of the grip. The partial length of the grip is illustrated as a cutaway lengthwise cross section so as to show a chronological series of before, during, and after stages of fitting insertion into the grip.

As shown in FIG. 5B, the ramped surface 16 of the fitting first meets the outer edge of the interior seating surface 24.

Such outer edge of the interior seating surface 24 may be beveled to facilitate movement of retaining shoulder 17 through and over the entirety of the interior seating surface 24. Here, it is also visible that the retaining shoulder 17 is sized with an outer dimension slightly larger than the inner dimension of the interior seating surface 24.

It should be understood that the material from which the grip is fabricated will have elastic qualities such that the interior seating surface 24 will expand to allow the retaining should 17 to ride over it, but snap back into place once the retaining shoulder 17 is completely through and past the interior retaining surface 24. This snap-fit action results in the configuration seen in FIG. 5C. Here, the interior seating surface 24 is shown abutting the exterior seating surface 11 of the fitting. Likewise, the annular lip 29 of the grip is shown abutting the shoulder surface 13 which effectively permanently retains the fitting within the grip. Moreover, in such configuration shown, each keyway boss 28a-28c and each corresponding keyway recess 19 interlock with one another upon abutment of the interior seating surface 24 with the exterior seating surface 11 so as to preclude rotational movement between the grip and the fitting. In this manner, both rotational and axial movement of the fitting within grip is prevented as the two are locked into place.

Figure 6:
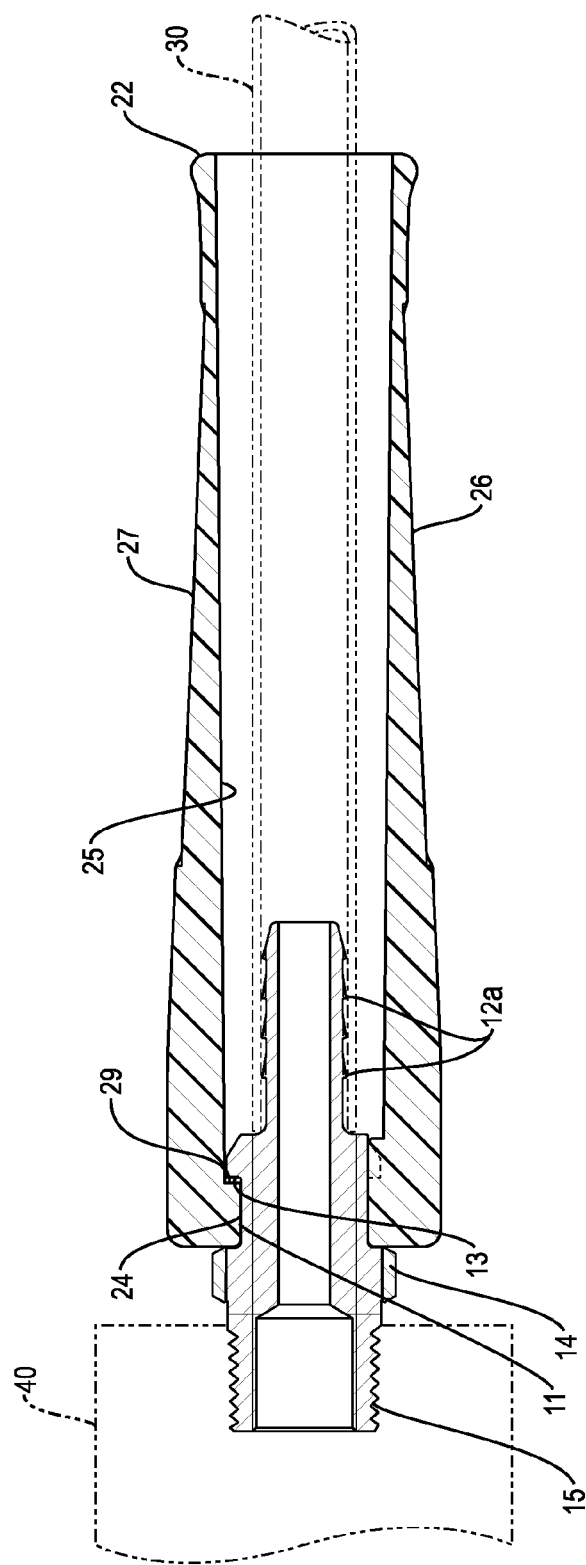
FIG. 6 shows a side view of the complete flexible tapered grip assembly of the invention connected with related elements shown in silhouette taken along line 6-6 of FIG. 3.

FIG. 6 illustrates a side view of the complete flexible tapered grip assembly taken along line 6-6 of FIG. 3. Here, the invention is shown after the fitting is snap-fit into the grip and after the fitting is threaded to a coupling mechanism 40 and length of tubing 30. In particular, it should be noted that the fitting includes barbs 12a, or some suitable structure, which retain the length of tubing 30 upon the fitting. The tubular interior 25 of the grip itself is also suitably larger than the outer diameter of the tubing 30 so as to allow both unrestricted movement of the tube and yet still allow the grip to function as a strain relief boot with integrated fitting for hydraulic connections. Thus, the present invention is a dual purpose strain relief boot and a grip for manual manipulation of a coupler (e.g., gladhand). Likewise, the space provided between the tubular interior 25 and the outer diameter of the tubing 30 also enables a coil spring (not shown) to be inserted over the tubing 30 all the way up to the fitting, further enhancing flexibility of the inventive assembly.

The strain relief aspect of the present invention also provides an "anti-kinking" characteristic such that the tubing attached to the fitting through the tapered grip section is precluded from kinking. Unrestricted movement of the tube within the grip at the end opposite the fitting occurs only to a point at which bending of the given tube will result in the tube coming into contact with the sidewall of the grip. Due to the tapered nature of the grip, the ability of the grip to bend along with the tube is a function of the thickness of the grip. The thinner end will therefore bend along with the abutting tube in a manner that is proportional with the varied thickness of the grip wall. This tapering provides flexible support of the tube while inhibiting the ability of the tube to kink. This is effective against kinking that may otherwise (in the absence of the present invention) occur during the time of connection or at the time of operation (e.g., during a turning of the tractor cab relative to the trailer). Elongation of the grip may be provided so as to further enhance the anti-kinking characteristics of the present invention. In such elongation instance, the grip may be provided in successively tapering sections interconnected to one another.

It should therefore be understood that the sidewall of the flexible tapered grip decreases in thickness along the substantially tubular interior from fitting end to a tear-resistant rail end, so as to oppose kinking of the tube during installation and operation. Moreover, the tear-resistant rail engages with the tube upon minimal bending radius, so as to provide freedom of movement of the tube during initial bending. Thus, the opposing of kinking of the tube is an increasing function of the decrease in thickness from fitting end to rail end and elongation of the flexible tapered grip. In this manner, the grip is elongated along the tube so as to increase anti-kinking characteristics of the overall grip and fitting assembly relative to the tube.

Figure 7:
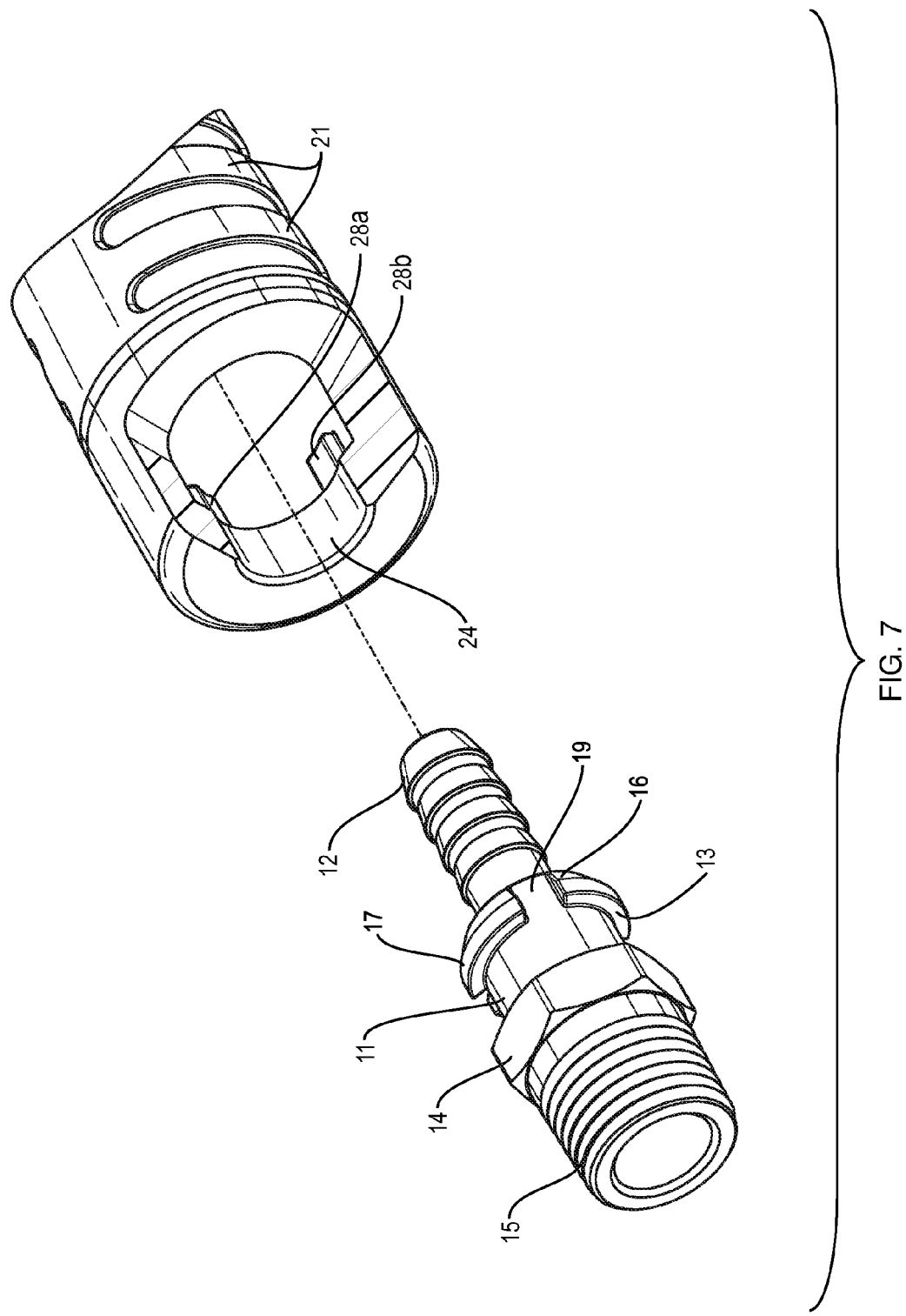
FIG. 7 shows a close-up view of the flexible tapered grip assembly according to the present invention shown with grip and fitting sections disconnected and the grip section partially cutaway to reveal internal keyway boss structures.

FIG. 7 is provided so as to more clearly illustrate the details of the internal keyway boss structures. Here, a close-up view of the flexible tapered grip assembly according to the present invention shows the grip and fitting sections disconnected and the grip section partially cutaway to reveal the internal keyway bosses 28a, 28b. Though three exist, it should be readily apparent that due to the cutaway aspect of FIG. 7 only two are shown. From this figure, it should be readily apparent that each keyway boss is formed integrally with the grip as part of the sidewall of the tubular interior 25. Moreover, the keyway boss has a surface that is collinear with the interior seating surface 24. Thus, the keyway boss structures are internal and integral with the unitarily formed grip.

In terms of implementation and use of the present invention, when used in conjunction with the all brass, corrosion-resistance fittings of the present invention, the grip and fitting assembly of the present invention provides improved bend and kink resistance during installation, operation, and gladhand connections and disconnections. Specifically, the present invention provides an improved thermo-composite flexible tapered grip and fitting design, the grip having increased thickness at the fitting end tapering to a tear-resistant rail at the hose and tube end of the fitting. The flexible tapered grip and grip fitting of the present invention further simplifies manufacture of the grip fitting assembly reducing cost and providing for longer operational life under bending and kinking.

Swivel Coupling

Figure 8:
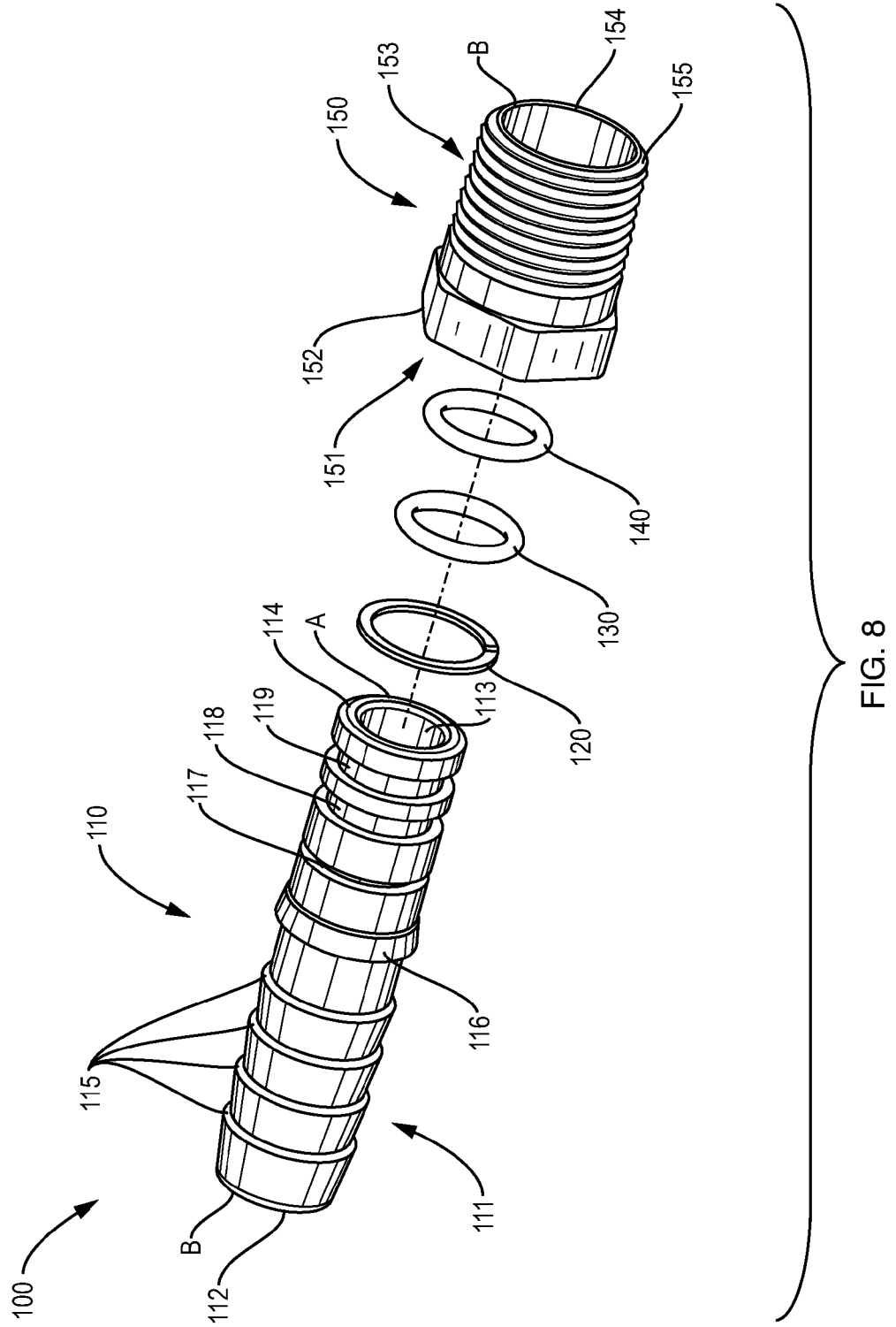
FIG. 8 is an exploded perspective view of the swivel coupling assembly according to this invention.

Referring to FIG. 8, there is shown a swivel coupling assembly 100, according to another aspect of this invention, in an exploded view depicting the two sub-assemblies, namely, annular barb insert assembly 110 and annular fitting sub-assembly 150. When joined the sub-assemblies form a rotatable coupling to interconnect, for example, two fluid carrying hoses (not shown), one affixed to each sub-assembly at ends 112 (barb insert end) and 154 (fitting assembly end), respectively. It should be noted that various size hoses may be accommodated by changing the sizes of the ends 112 (barb insert end) and 154 (fitting assembly end) of the sub-assemblies and the overall diameter of the swivel coupling assembly.

Barb insert assembly 110 is a machined metallic part formed of brass or a comparable material having an outer surface 111 with a varying radius along its length and an inner surface 113 defining a bore through which fluid may flow between the hoses interconnected by the swivel coupling assembly 100. On outer surface 111 of barb insert assembly 110 there is a barb insert 114 spaced from barb insert end 112, along the longitudinal axis A of barb insert assembly 110, and at the opposite end of said assembly. Beginning at end 112 are formed a series of annular barbs 115 (in this example there are four but there may be greater or fewer depending on the application) which are designed to be inserted into a hose up to approximately shoulder 116 and provide a certain amount of gripping force to hold the hose in place on barb insert assembly 110. The amount of gripping force may not be sufficient to hold the hose in place in the hostile environments encountered by these components, therefore, a metal crimp (not shown) may be installed over the hose in the area of the barb insert assembly to more securely hold the hose in place.

Between shoulder 116 and barb insert 114 are formed three annular grooves 117, 118, and 119 in outer surface 111 of barb insert assembly 110. The groove closest to shoulder 116 may be a retaining ring groove 117 in which retaining ring 120 is disposed. The diameter of the retaining ring 120 is slightly larger than the diameter of the outer surface 111 in the area adjacent to the retaining ring groove 117, which results in the retaining ring protruding above the outer surface 111 when it is disposed in the retaining ring groove 117. Retaining ring 120 may be formed of a metal, such as stainless steel, carbon steel or the like, to provide it with sufficient stiffness to hold the two sub-assemblies in place when they are interconnected, as described below. Retaining ring 120 is constructed in the form of a coil so that as force is applied about the circumference it compresses and its diameter is reduced and when the force is terminated the ring expands to its neutral position with an increased diameter. The width of groove 117 is only slightly larger than the width of retaining ring 120, allowing for insertion of the ring but providing a friction fit so as to retain it in place.

Grooves (or glands) 118 and 119 are also disposed in outer surface 111, but they are further along the longitudinal axis A and closer to barb insert 114 than groove 117. Grooves 118 and 119 may have a width greater than groove 117, so they can accommodate O-ring seals 130 and 140, respectively, which may have a greater width than retaining ring 120. The diameters of O-ring seals 130 and 140 are slightly larger than the diameter of the outer surface 111 in the area adjacent to grooves 118 and 119, which results in the O-ring seals protruding just above the outer surface 111 when they are disposed in the grooves. In this example, groove 119 abuts barb insert 114.

Still referring to FIG. 8, at end 154 of annular fitting assembly 150 are a series of threads 153 on the outer surface for engaging with the inner surface of a hose (not shown), for example. Opposite end 151 has a hexagonal nut 152, which may be engaged by a wrench or other appropriate tool to apply torque to the annular fitting assembly 150 as it is installed on the hose. Inner surface 155 defines a bore through which fluid may flow between the hoses interconnected by the swivel coupling assembly 100.

Figure 9A:
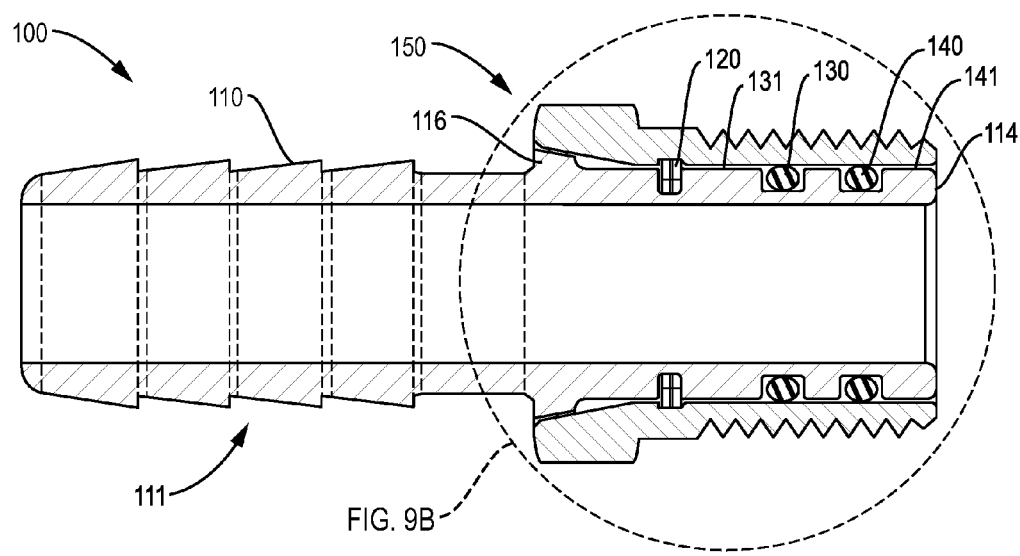
FIGS. 9A and 9B show a cross-sectional view of the swivel coupling assembly of FIG. 8 taken along line B-B.
Figure 9B:
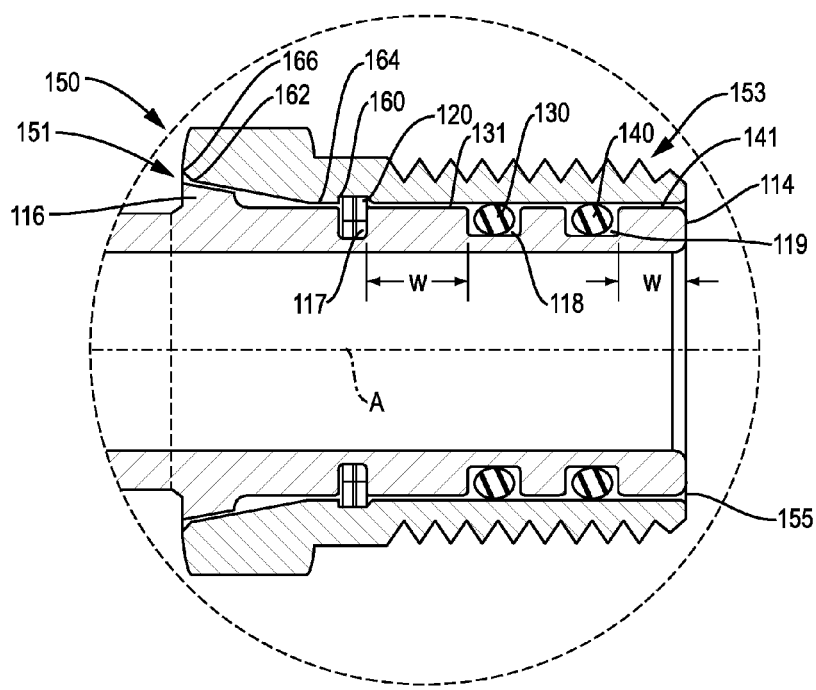

A cross-sectional view of swivel coupling assembly 100 is shown in FIGS. 9A and 9B with annular barb insert assembly 110 and annular fitting sub-assembly 150 joined to form a rotatable coupling. When the sub-assemblies are joined, outer surface 111 of barb insert assembly 110 (within fitting assembly 150) is mated with inner surface 155 annular fitting sub-assembly 150 and barb insert 114 is substantially aligned with end 154. At the opposite end 151 of annular fitting sub-assembly 150, barb insert shoulder 116 is mated with inner surface 155 and forms a frictional connection to allow for rotation of the annular barb insert assembly 110 with respect to the annular fitting sub-assembly 150.

Still referring to FIGS. 9A and 9B, retaining ring 120 is positioned in annular recess 160 formed in inner surface 155 and also in retaining ring groove 117. In this position, the annular barb insert assembly 110 and annular fitting sub-assembly 150 are locked together in place preventing them from being pulled apart. Retaining ring 120 is designed to withstand axial forces sufficiently greater than those likely to be encountered by the components under normal environmental conditions.

O-ring seals 130 and 140 are shown in a compressed state in annular grooves/glands 118 and 119, respectively, since the diameter of the bore in annular fitting sub-assembly 150 defined by inner surface 155 is slightly smaller than the diameters of O-ring seals 130 and 140. This forms tight seals with inner surface 155 to prevent fluids from flowing in the gap defined by outer surface 111 of annular barb insert assembly 110 and inner surface 155 of annular fitting sub-assembly 150. In addition, wide bearing surfaces 131 and 141 are included adjacent to O-rings 130 and 140, respectively, which are in contact with and bear against inner surface 155 of annular fitting sub-assembly 150 to provide stable bearing surfaces to protect the O-rings from abnormal loading. This is particularly important as the components wear over time and may otherwise become susceptible to wobble during rotation. By wide, what is meant is that the bearing surfaces are at least as wide as the width of the annular grooves/glands 118 and 119 and preferably wider. The typical range for each bearing surface may be from 1 to 3.5 times wider than the annular grooves. In this embodiment, it should be noted that bearing surface 131 is the external surface of barb insert 114.

By way of example, bearing surface 131 may be 0.186 in. in width and bearing surface 141 may be 0.113 in. in width. With annular grooves 118/119 having a width of 0.095 in. the bearing surfaces 131 and 141 are respectively 1.19 and 1.86 times the width of the annular grooves. These dimensions are provided only as an example and should not be considered as limiting the scope of the invention.

The O-ring seals 130 and 140 as well as the retaining ring 120 and the outer surface 111 in the region of the annular barb insert assembly 110 inside the bore of annular fitting sub-assembly may be coated with a lubricant to provide for a smoother and easier insertion and rotational movement when the coupling is installed. To further facilitate a smoother and easier insertion, proximate end 151 of annular fitting assembly 150, the opening to the bore defined by inner surface 155 at location 162 is shown to have a wider diameter than the nominal diameter of the bore, such as at location 164 and throughout the rest of the bore to end 154 (excluding annular recess 160). The portion of the bore having a nominal diameter is cylindrical in shape. From location 164 to 162 the diameter of inner surface 155 gradually increases at fixed angle relative to longitudinal axis A (approximately 5 to 10 degrees) about the circumference of the bore, thus forming a frusto-conically shaped section between locations 162 and 164. From location 162 to the end 151 is formed a chamfered outer edge 166 which further helps in the smooth insertion of the annular barb insert assembly 110 into the annular fitting assembly. In particular, chamfered edge 166 is helpful in transitioning the retaining ring 120 as it goes from its normal expanded position and it begins to be compressed when it enters the bore.

During the assembly process, as retaining ring 120 encounters chamfered edge 166 it is guided into place and once it enters the bore at location 162 the force and compression on retaining ring 120 begins and gradually increases until the ring reaches location 164. As the retaining ring is pressed further into the bore beyond location 164, it encounters annular recess 160, at which point the force on the circumference of the retaining ring 120 is removed and retaining ring 120 expands and locks in place in annular recess 160. Once locked in place in annular recess 160, the retaining ring 120 prevents further movement of annular barb insert assembly 110 in either direction in the bore. Once in the installed position it can be seen that the outer surface of shoulder 116 is angled in a complimentary fashion to the inner surface 155 of the annular fitting assembly in that region to allow for a proper frictional fit and enable rotation between the two sub-assemblies.

Figure 10:
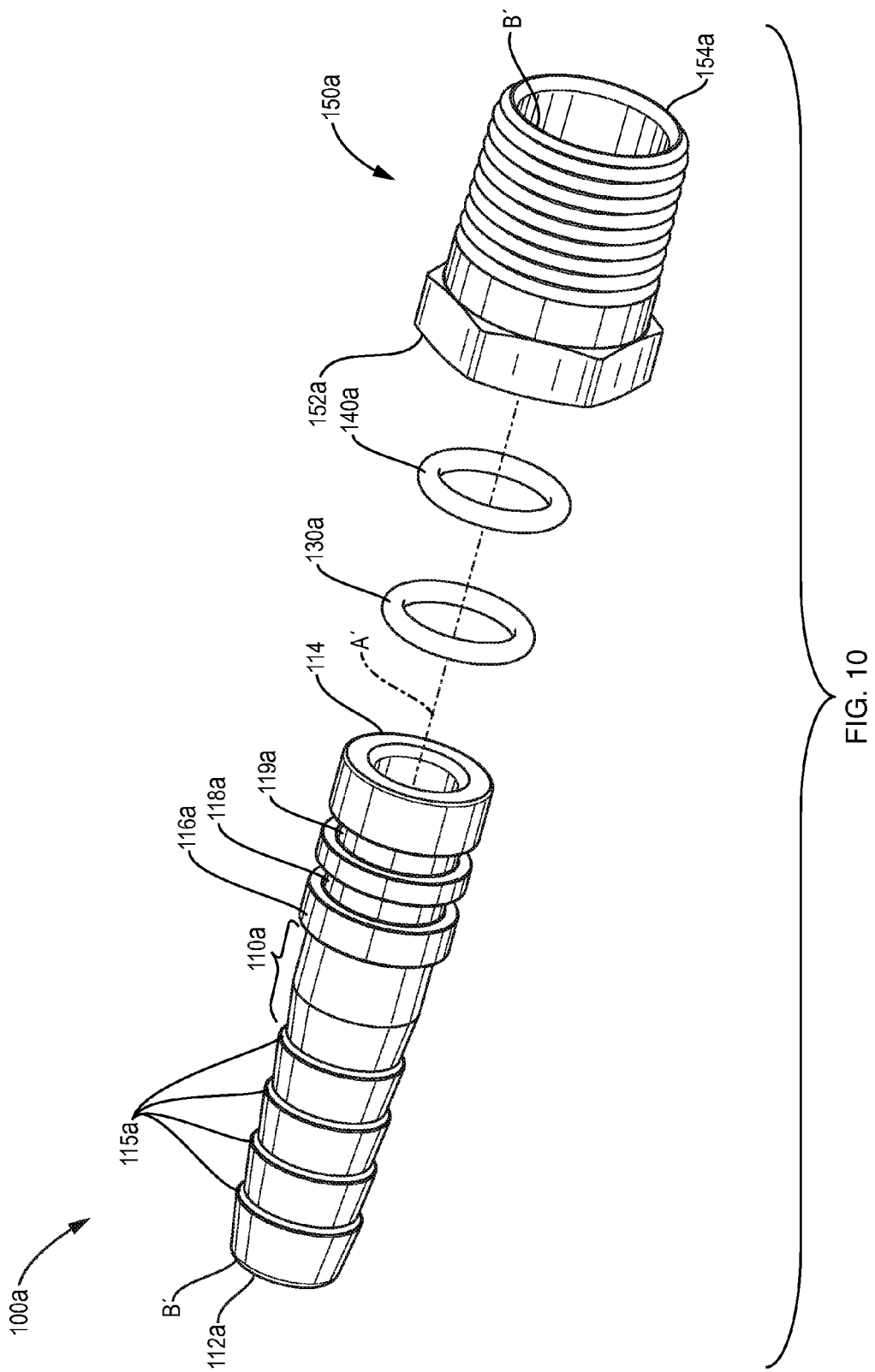
FIG. 10 is an exploded perspective view of another embodiment of the swivel coupling assembly according to an aspect of this invention.
Figure 11A:
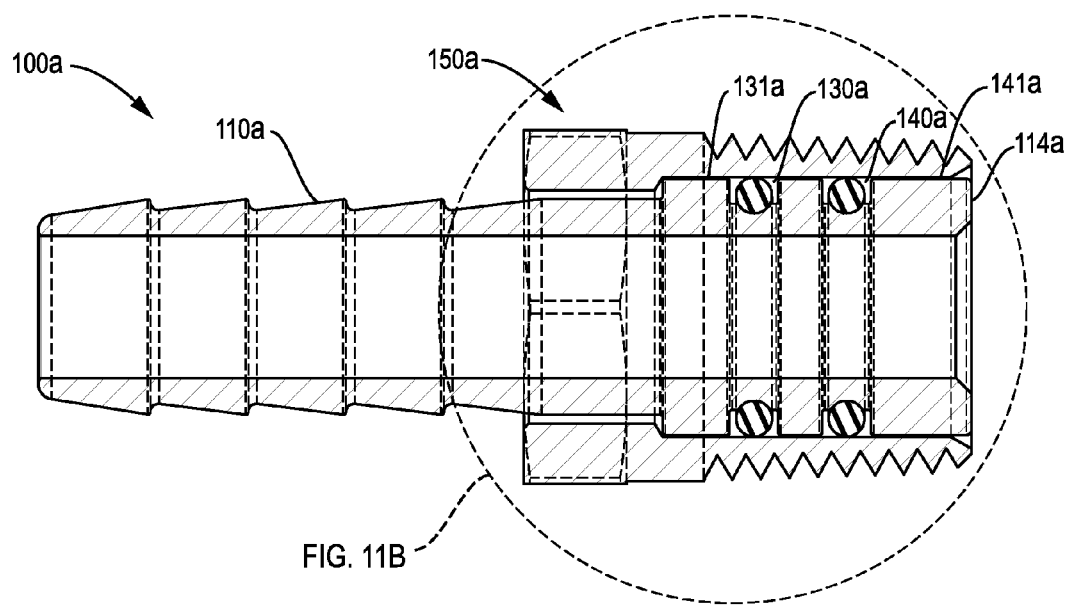
FIGS. 11A and 11B show a cross-sectional view of the swivel coupling assembly of FIG. 10 taken along line B'-B'.

An alternative embodiment of the swivel coupling assembly 100 of FIG. 8 is shown in FIGS. 10 and 11A/11B, as swivel coupling assembly 100a, which includes annular barb insert assembly 110a and annular fitting sub-assembly 150a. Most aspects of this swivel coupling assembly are the equivalent of swivel coupling assembly 100. The most notable difference is that there is no retaining ring groove or retaining ring used in this embodiment. Corresponding components in swivel coupling assembly 100 of FIG. 8 are similarly numbered in swivel coupling assembly 100a of FIG. 10 with the addition of letter designation "a".

Figure 11B:
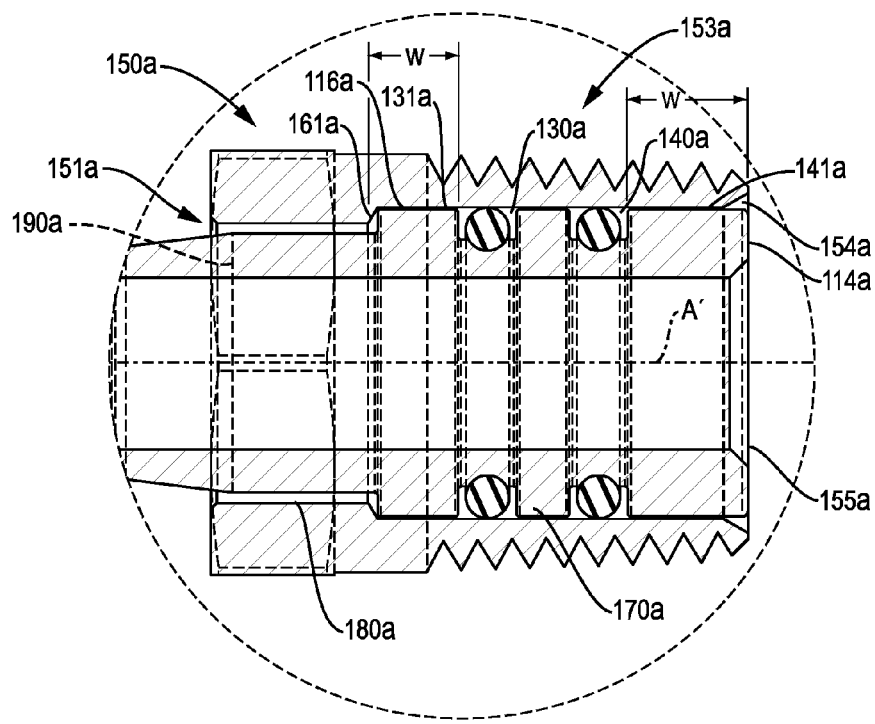

Referring to FIGS. 11A and 11B, the manner of assembling and retaining the annular barb insert assembly 110a and annular fitting sub-assembly 150a is depicted. Annular barb insert assembly 110a is inserted into annular fitting sub-assembly 150a through end 154a until the front side of shoulder 116a of barb insert assembly 110a abuts stop 161a formed in the inner surface 155a by changing the diameter of the bore defined by inner surface 155a in region 170a from a first diameter to a second, smaller diameter of the bore defined by inner surface 155a in region 180a. At the transition point, the stop 161a is formed. In this position, the outer surface 111a of section 190a of barb insert assembly 110a is mated with inner surface 155a in region 180a. It should be noted that the inner surface 155a in region 180a is not angled as there is no need for a wider opening and an angled transition as is the case with the embodiment of FIGS. 8 and 9, due to the absence of retaining ring 120.

As with the embodiment in FIGS. 9A and 9B, in the embodiment of FIGS. 11A/11B wide bearing surfaces 131a and 141a are included adjacent to O-rings 130a and 140a, respectively, which are in contact with and bear against inner surface 155a of annular fitting sub-assembly 150a to provide stable bearing surfaces to protect the O-rings from abnormal loading. By wide, what is meant is that the bearing surfaces are at least as wide as the width of the annular grooves/glands 118a and 119a and preferably wider. In this embodiment, it should be noted that bearing surface 131a is the external surface of barb insert 114a.

The typical range for each bearing surface may be from 1 to 3.5 times wider than the annular grooves. By way of example, in this embodiment, bearing surface 131a may be 0.155 in. in width and bearing surface 141a may be 0.310 in. in width. With annular grooves 118a/119a having a width of 0.095 in. the bearing surfaces 131a and 141a are respectively 1.63 and 3.26 times the width of the annular grooves. Again, this is merely a specific example and should not be considered as limiting the scope of the invention.

The O-ring seals 130a and 140a and the outer surface 111a in the region of the annular barb insert assembly 110a inside the bore of annular fitting sub-assembly may be coated with a lubricant to provide for a smoother and easier insertion and rotational movement when the coupling is installed. To further facilitate a smoother and easier insertion, proximate end 151a of annular fitting assembly 150a has a chamfered outer edge 166a which further helps in the smooth insertion of the annular barb insert assembly 110a into the annular fitting assembly.

Hose Assemblies and Kits Utilizing the Grip and/or Swivel Coupling

As indicated above, various hose assemblies and kits using the flexible tapered grip assembly and/or the swivel coupling will be described. As shown in FIG. 12A, hose assembly 200a includes hose 210a which can be of any desired diameter and/or length. On a single end of hose 210a is installed a swivel coupling assembly which can be either the swivel coupling assembly 100 or 100a, as described above. The swivel coupling assembly is secured to hose 210a using crimp 216a. On the other end of hose 210a may be installed a fitting other than the swivel coupling. Similarly, hose assembly 200b shown in FIG. 12B includes hose 210b of any length but in this case, on each end of hose 210b, is installed a swivel coupling assembly which can be either the swivel coupling assembly 100 or 100a, as described above. The swivel coupling assemblies are secured to hose 210b using crimps 216b and 218b, respectively.

Figure 13B:
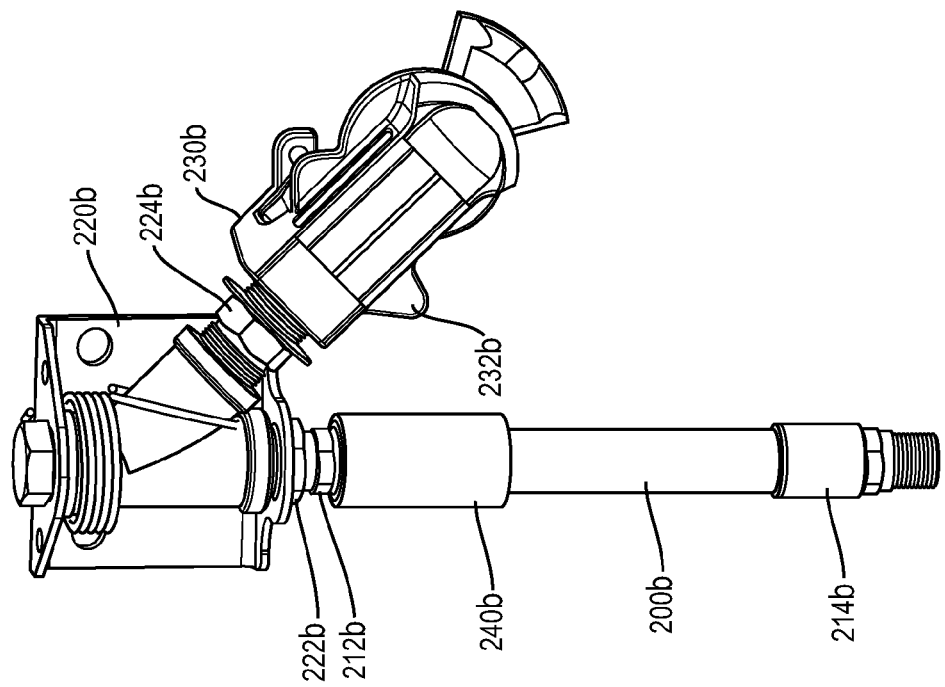
FIGS. 13A and 13B are perspective views of a hose assemblies having swivel couplings installed gladhand "swinger" fixtures, according to an aspect of this invention.
Figure 13A:
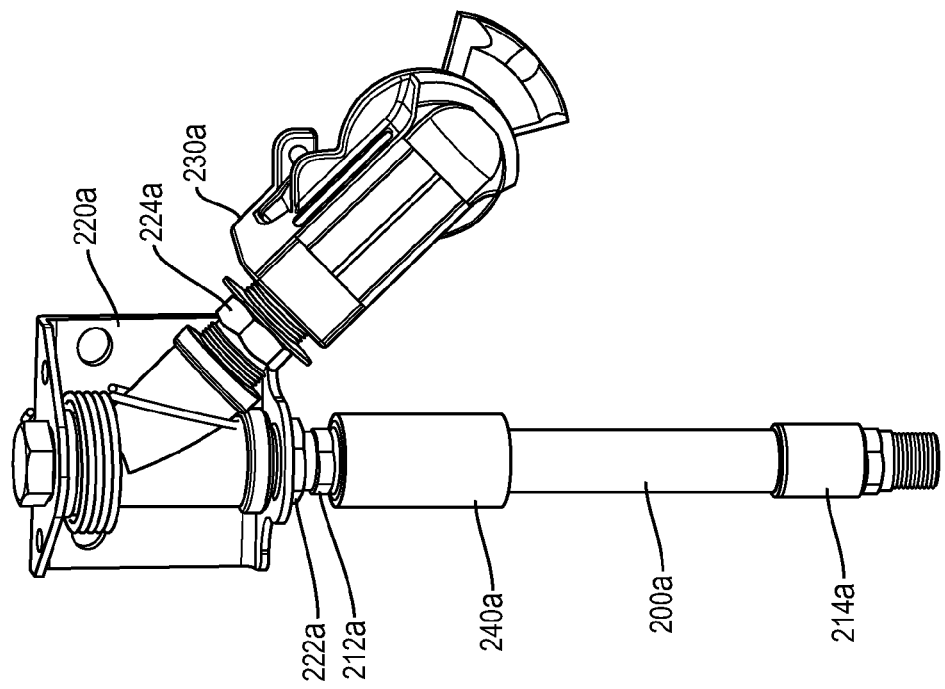

One application of hose assembly 200 is shown in FIG. 13 to be installed on a coupling fixture application for use with a gladhand. A coupling fixture may include a swinger assembly or a pair of swinger assemblies affixed to a bulkhead (not shown). Hose assemblies 200a and 200b are shown to be affixed to coupling fixtures 220a and 220b, respectively. Hose assemblies 200a and 200b are affixed to first ports 222a and 222b by means of swivel coupling assemblies 212a and 212b, respectively. Second ports 224a and 224b of fixtures 220a and 220b are connected to gladhand fixtures 230a and 230b. Installed over hose assembly 200a about swivel coupling assembly 212a is swinger collar 240a. Installed over hose assembly 200b about swivel coupling assembly 212b is swinger collar 240b. Swinger collars 240a and 240b may contain markings or color coding to make apparent to which coupling fixture they are to be attached, for example, red for the "emergency brake" gladhand of FIG. 13A and blue for the normal braking gladhand of FIG. 13B also distinguished by "ear" 232b. For example, swinger collar 240a may be the same color as glad hand 230a to make proper connection very easy for the installer. Likewise, swinger collar 240b may be the same color as gladhand 230b.

Figure 14:
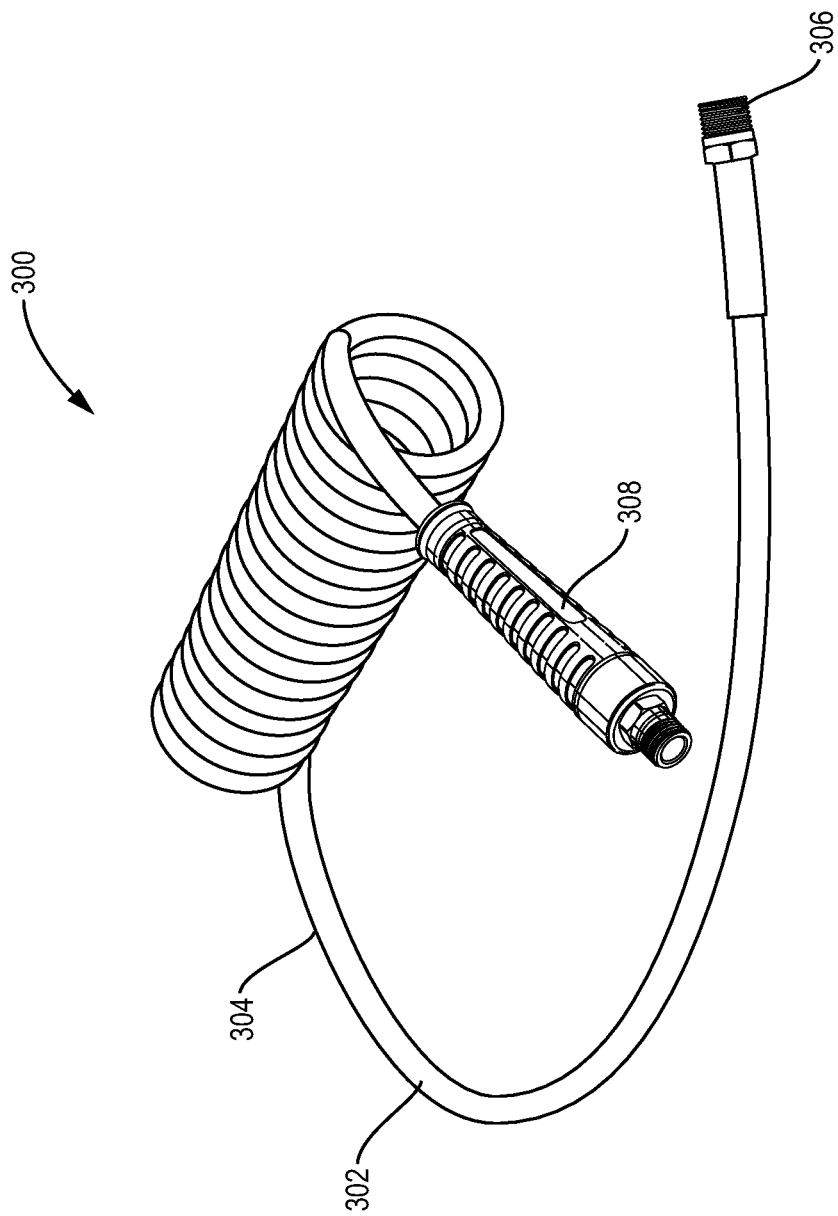
FIG. 14 is a perspective view of another hose assembly with a swivel coupling according to an aspect of this invention installed at one end of the hose and a taper grip assembly at the other end of the hose.

In another application, shown in FIG. 14, a hose coil assembly 300 is shown to include a length of hose 302, which may be plated with heavy duty, corrosion resistant spring guards 304 (although it is not a requirement). Assembly 300 may be an air coil assembly or may be any assembly having a first and second end onto to which grips and fixtures as described herein are applied. On a first end of hose 302 may be installed a swivel coupling assembly 306, such as swivel coupling assembly 100 or 100a described above. On a second end of hose 302 may be installed a grip assembly 308, such as the flexible tapered grip assembly described herein with regard to FIGS. 1-7. However, it should be noted that any suitable grip assembly could be used for grip assembly 308.

Figure 15A:
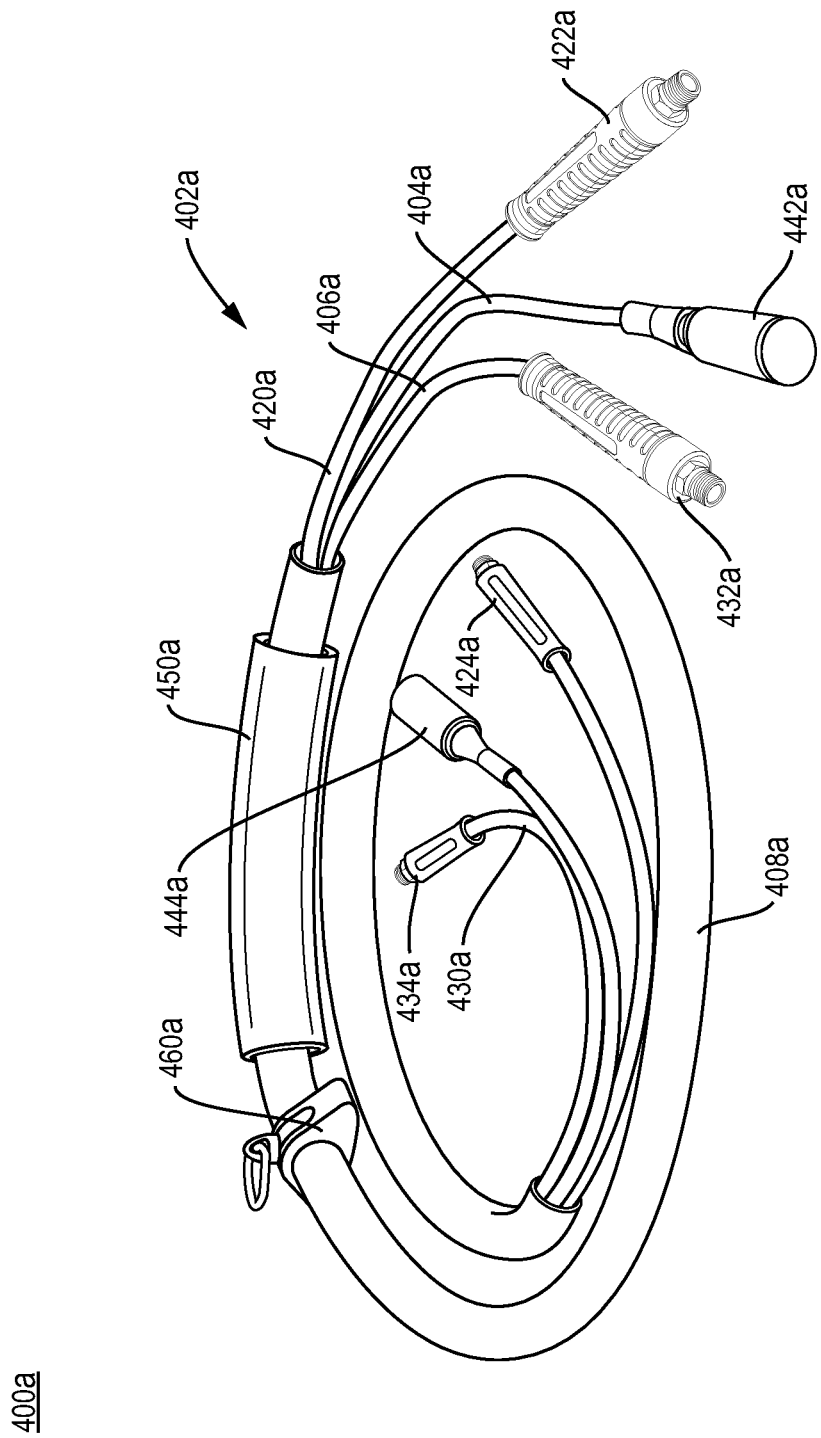
FIGS. 15A and 15B are perspective views of kits including hose and tube assemblies having a swivel coupling according to an aspect of this invention installed at one end of the hose and a taper grip assembly at the other end of the hose.

In FIG. 15A, there is shown a kit 400a which includes two or more assemblies, such as assemblies 402a, 404a, and 406a required for a particular installation, wherein the assemblies are neatly bundled together by a heavy duty spiral wrap 408a. Assembly 402a may be comprised of a hose 420a with a grip assembly 422a installed on one end and a swivel coupling 424a installed on the other end. Similarly, assembly 406a may be comprised of a hose 430a with a grip assembly 432a installed on one end and a swivel coupling 434a installed on the other end. The swivel coupling assemblies may be the same as swivel coupling assembly 100 or 100a described above. The grip assemblies may be the same as the flexible tapered grip assembly described herein with regard to FIGS. 1-7. However, it should be noted that any suitable grip assembly could be used for grip assemblies. Assembly 404a may be an electrical power assembly and comprises cable 440a which has electrical connectors 442a and 444a disposed on either end of cable 440a. Kit 400a may also include a banner 450a made of a durable plastic material wrapped about the kit to include labeling describing the kit and displaying the name brand of the product.

Figure 16A:
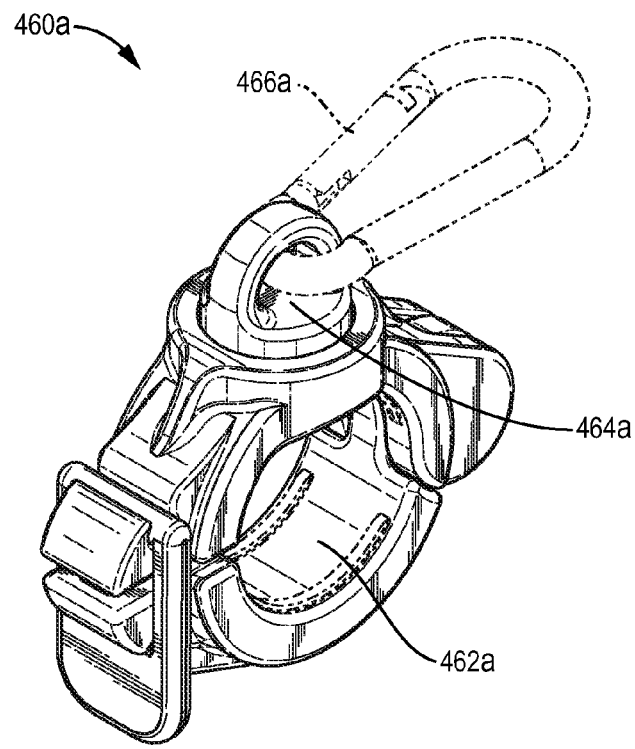
FIGS. 16A and 16B shows various components optionally used in the assemblies and kits incorporating swivel couplings and/or flexible tapered grip shown in FIGS. 12-15.

Kit 400a may further include a clamp assembly 460a which can be located at various positions along the lengths of the hoses/cable product to lift and secure the kit when the various assemblies are connected. Clamp assembly 460a is more clearly depicted in FIG. 16A to include clamp ring 462a which is affixed about the assemblies and the spiral wrap and a loop 464a through which a line 466a may be tied and fastened to a point on the vehicle or other system the kit is being mounted to elevate the assemblies as needed. Kit 400a may include a hangar (not shown) or vertical support (not shown) attached to clamp 460a to hold entire kit in place relative to connection points of the hose assemblies.

Figure 15B:
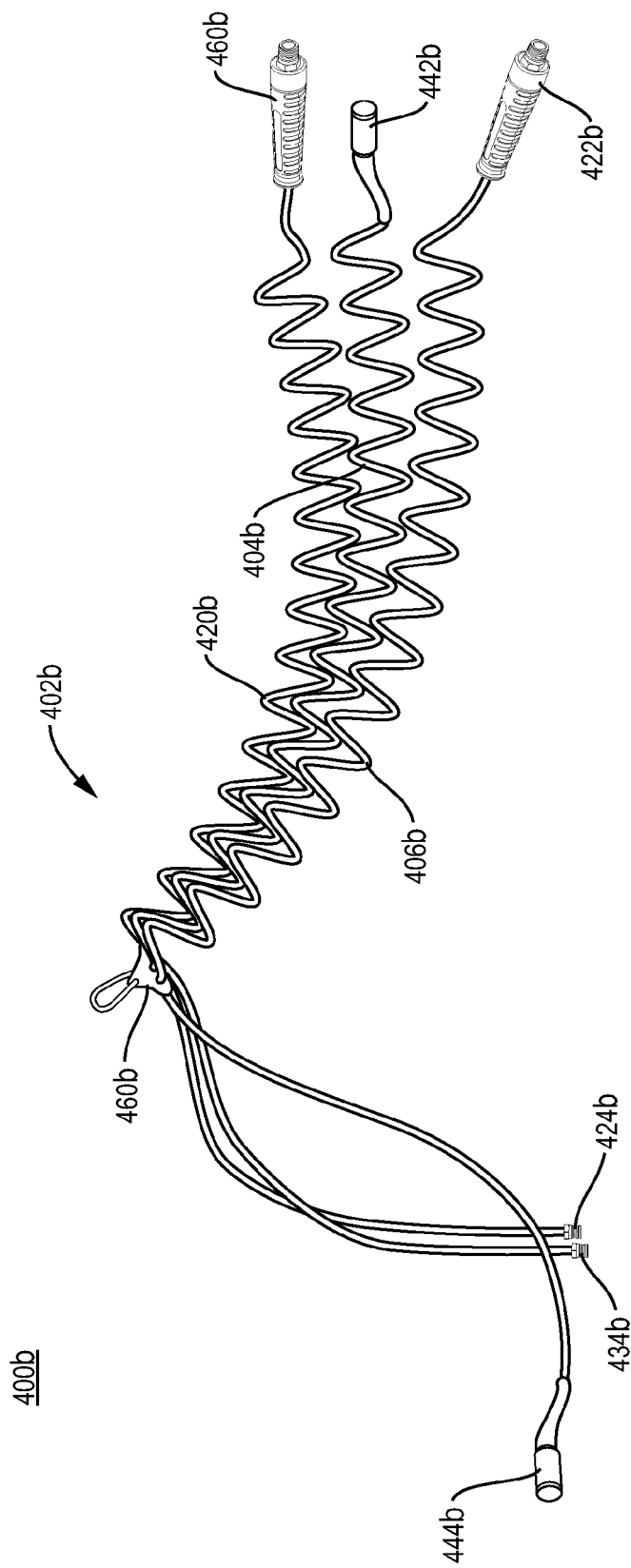

Similarly, there is shown in FIG. 15B, a kit 400b which includes two or more assemblies, such as assemblies 402b, 404b, and 406b required for a particular installation, wherein hose coil assembly 402b may be comprised of a hose 420b with a grip assembly 422b installed on one end and a swivel coupling 424b installed on the other end. Similarly, hose coil assembly 406b may be comprised of a hose 430b with a grip assembly 432b installed on one end and a swivel coupling 434b installed on the other end. The swivel coupling assemblies may be the same as swivel coupling assembly 100 or 100a described above. The grip assemblies may be the same as the flexible tapered grip assembly described herein with regard to FIGS. 1-7. However, it should be noted that any suitable grip assembly could be used for grip assemblies. Assembly 404b may be an electrical power assembly and comprises cable 440b which has electrical connectors 442b and 444b disposed on either end of cable 440b.

Figure 16B:
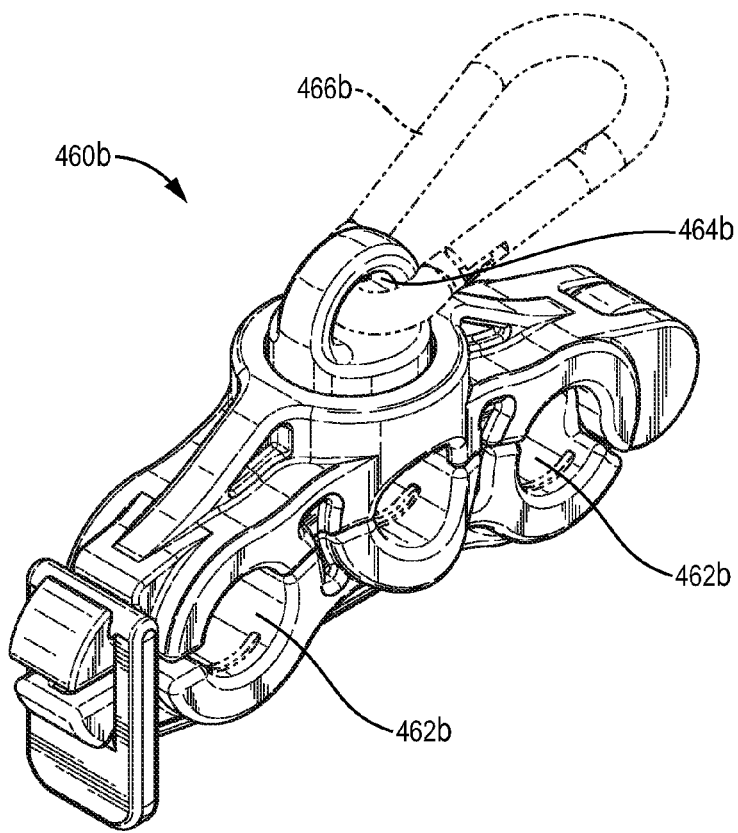

Kit 400b may further include a clamp assembly 460b which can be located at various positions along the lengths of the hoses/cable product to lift and secure the kit when the various assemblies are connected. Clamp assembly 460b is more clearly depicted in FIG. 16B to include clamp rings 462b which are affixed about assemblies 402b and 406b and a loop 464 through which a line 466 may be tied and fastened to a point on the vehicle or other system the kit is being mounted to elevate the assemblies as needed. Kit 400b may include a hangar (not shown) or vertical support (not shown) attached to clamp 460b to hold the entire kit in place relative to connection points of the hose assemblies.

While the foregoing description of the invention enables one of ordinary skill to make and use what is considered presently to be the best mode thereof, those of ordinary skill will understand and appreciate the existence of variations, combinations, and equivalents of the specific embodiments and examples herein.

The above-described embodiments of the present invention are intended to be examples only. Alterations, modifications and variations may be effected to the particular embodiments by those of skill in the art without departing from the scope of the invention, which is defined solely by the claims appended hereto.

The invention is therefore not limited by the above-described embodiments and examples, or embodiments and applications within the scope and spirit of the invention claimed as follows.

What is claimed is:

1. A swivel coupling assembly, comprising:
a first annular member having an outer surface and an inner surface, the first annular member including:
a first end portion having at least one annular barb;
a second end portion spaced from the first end portion and including an insert member;
an angled shoulder positioned between the at least one annular barb and the insert member;
first and second annular grooves disposed in the outer surface of the first annular member and positioned between the shoulder and the insert member, the first and second annular grooves each containing a seal and the first annular groove being adjacent to the insert member and the second annular groove being positioned between the first annular groove and the shoulder;
a first bearing surface on a side of the first annular groove in the direction of the insert member and a second bearing surface on a side of the second annular groove in the direction of the shoulder; wherein the first bearing surface and the second bearing surface have a width equal to or greater than a width of the first annular groove;
an annular retaining ring groove disposed in the surface of the first annular member and positioned between the second annular groove and the shoulder, the annular retaining ring groove containing a retaining ring which protrudes above the surface of the first annular member;
a second annular member having an outer surface and an inner surface, the inner surface defining a bore configured to receive the first annular member, the second annular member including:
a first end portion having a first opening in communication with the bore; and
a second end portion spaced from the first end portion and having a second opening in communication with the bore;
an annular recess in the inner surface of the bore, wherein the annular recess is configured to receive the retaining ring when the first annular member is inserted into the second annular member, and wherein the annular recess is aligned with the annular retaining ring groove;
wherein from a location proximate the first opening in the first end portion of the second annular member to a cylindrical portion of the bore, the inner surface of the bore is frusto-conically shaped and wherein the frusto-conically shaped inner surface is angled at least five degrees with respect to a longitudinal axis of the second annular member;
wherein, when the first annular member is inserted into the bore of the second annular member:
the retaining ring is gradually compressed as the retaining ring travels along the frusto-conically shaped inner surface of the bore until it reaches the annular recess and expands into and is seated in the annular recess;
the angled shoulder of the first annular member conforms with and frictionally engages the frusto-conically shaped inner surface of the bore of the second annular member proximate the first opening, thereby allowing the first annular member to rotate relative to the second annular member; and
the insert member of the first annular member terminates in the bore proximate the second opening such that the first annular groove is spaced by a distance of at least the width of the first bearing surface from the second opening.

2. The swivel coupling of claim 1 wherein the first bearing surface and the second bearing surface have widths between one (1) and three and one half (3.5) times the width of the at least one annular groove.

3. The swivel coupling of claim 1 wherein the first opening in the first end portion has a chamfered edge.

4. The swivel coupling of claim 1 wherein the first end portion of the first annular member includes a plurality of annular barbs which are configured to engage and retain a hose.

5. The swivel coupling of claim 1 wherein the inner surface of the first annular member defines a bore configured to carry a fluid there-through.

6. The swivel coupling of claim 1 wherein the outer surface of the second annular member includes a threaded portion for being inserted into and engaged with a hose or a complimentarily threaded fixture and wherein the outer surface of the second annular member further includes a head having a plurality of flat surfaces configured to be engaged by a tool to impart torque to rotate the second annular member to engage the hose or a complimentarily threaded fixture.

7. A hose assembly, comprising:
a hose having a first end and a second end;
a first swivel coupling affixed to the first end of the hose;
a second swivel coupling affixed to the second end of the hose;
wherein each of the first and second swivel couplings comprise:
   a first annular member having an outer surface and an inner surface, the first annular member including:
   a first end portion having at least one annular barb;
   a second end portion spaced from the first end portion and including an insert member;
   an angled shoulder positioned between the at least one annular barb and the insert member;
   first and second annular grooves disposed in the outer surface of the first annular member and positioned between the shoulder and the insert member, the first and second annular grooves each containing a seal and the first annular groove being adjacent to the insert member and the second annular groove being positioned between the first annular groove and the shoulder;
   a first bearing surface on a side of the first annular groove in the direction of the insert member and a second bearing surface on a side of the second annular groove in the direction of the shoulder; wherein the first bearing surface and the second bearing surface have a width equal to or greater than a width of the first annular groove;
   an annular retaining ring groove disposed in the surface of the first annular member and positioned between the second annular groove and the shoulder, the annular retaining ring groove containing a retaining ring which protrudes above the surface of the first annular member;
   a second annular member having an outer surface and an inner surface, the inner surface defining a bore configured to receive the first annular member, the second annular member including:
   a first end portion having a first opening in communication with the bore; and
   a second end portion spaced from the first end portion and having a second opening in communication with the bore;
      an annular recess in the inner surface of the bore, wherein the annular recess is configured to receive the retaining ring when the first annular member is inserted into the second annular member, and wherein the annular recess is aligned with the annular retaining ring groove;
   wherein from a location proximate the first opening in the first end portion of the second annular member to a cylindrical portion of the bore, the inner surface of the bore is frusto-conically shaped and wherein the frusto-conically shaped inner surface is angled at least five degrees with respect to a longitudinal axis of the second annular member;
wherein, when the first annular member is inserted into the bore of the second annular member:
   the retaining ring is gradually compressed as the retaining ring travels along the frusto-conically shaped inner surface of the bore until it reaches the annular recess and expands into and is seated in the annular recess;
   the angled shoulder of the first annular member conforms with and frictionally engages the frusto-conically shaped inner surface of the bore of the second annular member proximate the first opening, thereby allowing the first annular member to rotate relative to the second annular member; and
   the insert member of the first annular member terminates in the bore proximate the second opening such that the first annular groove is spaced by a distance of at least the width of the first bearing surface from the second opening.

8. The hose assembly of claim 7 wherein the first bearing surface and the second bearing surface have widths between one (1) and three and one half (3.5) times the width of the at least one annular groove.

9. The hose assembly of claim 7 wherein for the first and second swivel couplings the first opening in the first end portion has a chamfered edge.

10. The hose assembly of claim 7 wherein proximate each of the first end and the second end of the hose is included a collar disposed about the hose, the collar including an identification marking.

* * * * *